United States Patent
Ebner et al.

(10) Patent No.: US 11,841,079 B2
(45) Date of Patent: Dec. 12, 2023

(54) METHOD FOR CONTROLLING AN AUTOMATIC TRANSMISSION OF A VEHICLE

(71) Applicant: BRP-ROTAX GMBH & CO. KG, Gunskirchen (AT)

(72) Inventors: Robert Ebner, Edt bei Lambach (AT); David Fillion, Drummondville (CA); Verena Wolfsegger, Roitham am Traunfall (AT); Petra Wiesinger, Aichkirchen / Lambach (AT); Roman Schmied, Schwanenstadt (AT); Michael Kaar, Ottenschlag (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/161,243

(22) Filed: Jan. 30, 2023

(65) Prior Publication Data

US 2023/0304575 A1  Sep. 28, 2023

Related U.S. Application Data

(60) Provisional application No. 63/304,133, filed on Jan. 28, 2022.

(51) Int. Cl.
| | |
|---|---|
| *F16H 61/16* | (2006.01) |
| *F16H 59/44* | (2006.01) |
| *F16H 59/46* | (2006.01) |
| *F16H 59/50* | (2006.01) |
| *F16H 59/48* | (2006.01) |

(52) U.S. Cl.
CPC .............. *F16H 61/16* (2013.01); *F16H 59/44* (2013.01); *F16H 59/46* (2013.01); *F16H 59/48* (2013.01); *F16H 59/50* (2013.01)

(58) Field of Classification Search
CPC .......... F16H 59/44; F16H 59/46; F16H 59/48; F16H 59/50; F16H 61/16; F16H 2061/163
See application file for complete search history.

(56) References Cited

U.S. PATENT DOCUMENTS

| | | | |
|---|---|---|---|
| 4,984,161 A * | 1/1991 | Nakazawa | F16H 61/46 701/55 |
| 9,981,519 B2 | 5/2018 | Despres-Nadeau et al. | |
| 2011/0153174 A1* | 6/2011 | Roberge | F16H 63/062 474/11 |
| 2013/0096790 A1* | 4/2013 | Nelson | F16H 63/067 701/58 |
| 2017/0327004 A1* | 11/2017 | Mochizuki | B60W 10/08 |
| 2022/0243810 A1* | 8/2022 | Truskolaski | F16H 61/662 |

* cited by examiner

Primary Examiner — Edwin A Young
(74) Attorney, Agent, or Firm — BCF LLP

(57) ABSTRACT

A method for controlling an automatic transmission of a vehicle includes: sensing a speed of the vehicle; sensing an acceleration of the vehicle along three spatial axes; determining that the vehicle is in a jump state associated with the vehicle being off a ground surface, the jump state being defined at least in part by the acceleration of the vehicle along the three spatial axes and the speed of the vehicle; and controlling the transmission according to a jump strategy in response to determining that the vehicle is in the jump state. Other methods for controlling an automatic transmission of a vehicle are also contemplated.

11 Claims, 24 Drawing Sheets

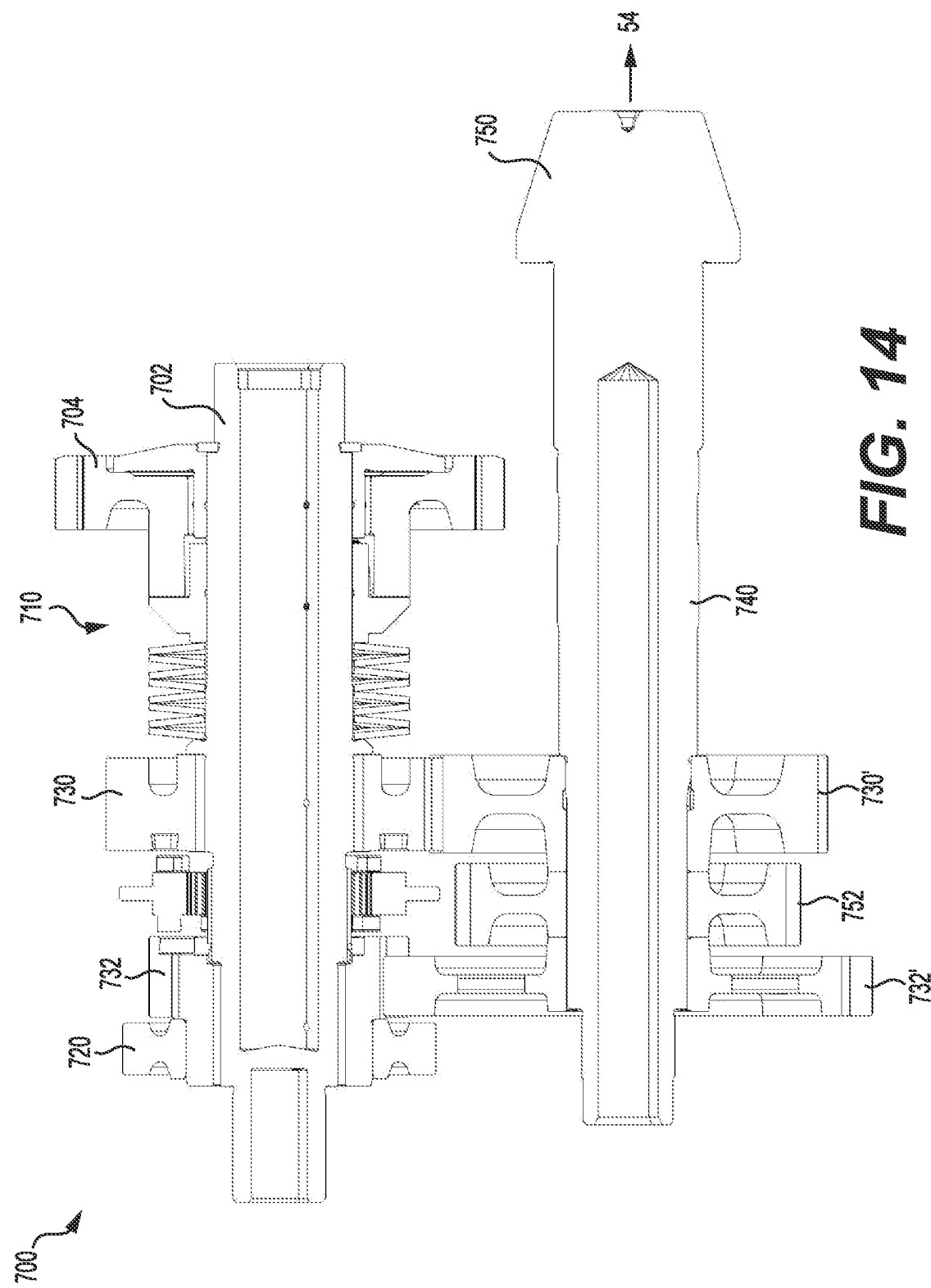

METHOD FOR CONTROLLING AN AUTOMATIC TRANSMISSION OF A VEHICLE

CROSS-REFERENCE

The present application claims priority to U.S. Provisional Patent Application No. 63/304,133, filed Jan. 28, 2022, the entirety of which is incorporated herein by reference.

TECHNICAL FIELD

The present technology relates to automatic transmissions, including dual-clutch transmissions, and methods for control thereof.

BACKGROUND

Off-road vehicles have powertrains that can incorporate different types of transmission, such as a continuously variable transmission (CVT) or a manually operated transmission. However, other types of transmissions could be used in off-road vehicles and offer different performance in certain conditions than the aforementioned CVT and manually operated transmission.

A dual-clutch transmission (DCT) is a type of transmission that includes first and second clutches. The first clutch drives the odd-numbered transmission gears via a first shaft, and the second clutch drives the even-numbered transmission gears via a second shaft. In a DCT, gear changes can be accomplished without interrupting torque distribution to the driven wheels. The torque of the engine is applied to one clutch at the same time as it is being disconnected from the other clutch. Since alternate gear ratios can preselect an odd transmission gear on one shaft while the vehicle is being driven in an even transmission gear (and vice versa), DCTs offer good shifting performance and efficiency in certain conditions. However, dual-clutch transmissions have not been made widely available in off-road vehicles yet. Reasons causing the delay of their widespread adoption in off-road vehicles include relatively high manufacturing costs and packaging issues due to the limited space in the engine compartment.

Control schemes for automatic transmissions, including DCTs, are also not typically adapted for the use of those transmissions in off-road vehicles. Notably, off-road vehicles may be subject to events that are not common in road vehicles, and their use in an off-road environment might cause a driver to have different operational considerations than a driver of a road vehicle. For example, off-road vehicles are more likely to be involved in a jump (i.e., being completely off the ground). As another example, a clutch of the transmission of an off-road vehicle is more likely to be subjected to variations in torque due to the terrain in which off-road vehicles are operated. In addition, safety considerations for the driver of an off-road vehicle might be different than those of a road vehicle driver and therefore deferring to the driver's judgement may be beneficial in some cases rather than automatically imposing limits based on sensor inputs. Moreover, while disabling semi-automatic control of the transmission of a road vehicle based on changing driving situations is known, this may not be as suitable for an off-road vehicle since driving situations can tend to change rather quickly for an off-road vehicle. For these and other reasons, control schemes that might be suitable for controlling a transmission of a road vehicle may not be as well adapted for controlling the transmission of an off-road vehicle.

Therefore, there is a desire for methods for controlling an automatic transmission of a vehicle, and particularly of an off-road vehicle.

SUMMARY

It is an object of the present to ameliorate at least some of the inconveniences present in the prior art.

According to an aspect of the present technology, there is provided a method for controlling an automatic transmission of a vehicle, comprising: sensing a speed of the vehicle; sensing an acceleration of the vehicle along three spatial axes; determining that the vehicle is in a jump state associated with the vehicle being off a ground surface, the jump state being defined at least in part by the acceleration of the vehicle along the three spatial axes and the speed of the vehicle; and controlling the transmission according to a jump strategy in response to determining that the vehicle is in the jump state.

In some embodiments, the jump state is defined at least in part by: the sum of the absolute values of the acceleration of the vehicle along the three spatial axes being less than or equal to a predetermined acceleration value; and the speed of the vehicle being greater than a predetermined speed.

In some embodiments, controlling the transmission according to the jump strategy comprises preventing shifting of an engaged gear of the transmission.

In some embodiments, the method further comprises: determining that the vehicle has exited the jump state based at least on the acceleration of the vehicle along at least one of the three spatial axes; and controlling the transmission of the vehicle according to a post-jump strategy in response to determining that the vehicle has exited the jump state, the post-jump strategy being different from the jump strategy.

In some embodiments, determining that the vehicle has exited the jump state comprises sensing an increase of the acceleration of the vehicle along the three spatial axes.

In some embodiments, the method further comprises: prior to controlling the transmission according to the post-jump strategy and while controlling the transmission according to the jump strategy; identifying a vehicle pre jump speed corresponding to the speed of the vehicle immediately prior to the vehicle having been determined to be in the jump state; sensing a speed of a rear wheel of the vehicle after the vehicle has exited the jump state; and determining that the rear wheel has touched the ground surface based at least in part on the speed of the rear wheel and the vehicle pre jump speed, the transmission being controlled in the post-jump strategy once it has been determined that the vehicle has exited the jump state and that the rear wheel has touched the ground surface.

In some embodiments, the rear wheel is determined to have touched the ground surface in response to an absolute value of a difference between the speed of the rear wheel and the vehicle pre jump speed being less than or equal to a predetermined threshold speed difference.

In some embodiments, the method further comprises, prior to controlling the transmission according to the post-jump strategy and while controlling the transmission according to the jump strategy: identifying a vehicle pre jump speed corresponding to the speed of the vehicle immediately prior to the vehicle having been determined to be in the jump state; sensing a speed of a rear wheel of the vehicle after the vehicle has exited the jump state; determining if the rear wheel has touched the ground surface based at least in part on the speed of the rear wheel and the vehicle pre jump speed; in response to determining that the vehicle has exited the jump state and that the rear wheel has touched the ground surface based at least in part on the speed of the rear wheel and the vehicle pre-jump speed, controlling the transmission in the post jump strategy; in response to the rear wheel having been determined not to have touched the ground surface based at least in part on the speed of the rear wheel and the vehicle pre jump speed: determining a time elapsed since an initial time reference point at which the vehicle was either in the jump state or had just exited the jump state; and controlling the transmission in the post-jump strategy once it has been determined that the vehicle has exited the jump state and that the time elapsed since the initial time reference point is equal to or greater than a predetermined timeout.

In some embodiments, the method further comprises, prior to controlling the transmission according to the post-jump strategy and while controlling the transmission according to the jump strategy: determining a time elapsed since an initial time reference point at which the vehicle was either in the jump state or had just exited the jump state, the transmission being controlled in the post-jump strategy once it has been determined that the vehicle has exited the jump state and that the time elapsed since the initial time reference point is equal to or greater than a predetermined timeout.

In some embodiments, the predetermined timeout is less than 1 second.

In some embodiments, controlling the transmission according to the post-jump strategy comprises allowing shifting of an engaged gear of the transmission.

According to another aspect of the present technology, there is provided a method for controlling an automatic transmission of a vehicle, comprising: monitoring at least one operational parameter of the vehicle; determining, based on said monitoring, that the vehicle is in a fault state associated with faulty operation of at least part of the vehicle; in response to determining that the vehicle is in the fault state, restricting operation of the transmission; receiving an override signal from a user-operated actuator; and in response to receiving the override signal, disabling restricted operation of the transmission despite the fault state having been determined.

In some embodiments, the at least one operational parameter includes a temperature measured at the transmission.

In some embodiments, the temperature is at least one of: a temperature of a clutch of the transmission; and a temperature of transmission fluid contained within the transmission.

In some embodiments, the at least one operational parameter includes a speed of the vehicle.

In some embodiments, the at least one operational parameter includes a shifter position of a shifter of the transmission.

In some embodiments, monitoring the at least one operational parameter comprises sensing of the at least one operational parameter by a sensor; and determining that the vehicle is in the fault state comprises at least one of: determining that the sensor is malfunctioning; and determining that a sensed value of the at least one operational parameter is outside of an acceptable or expected range of values of the at least one operational parameter.

In some embodiments, restricting operation of the transmission comprises at least one of: preventing a gear shift of the transmission; disengaging a clutch of the transmission; and disabling engagement of selected gears of the transmission.

According to another aspect of the present technology, there is provided a method for controlling an automatic transmission of a vehicle, comprising: operating the transmission in an automatic mode whereby gear shifting of the transmission is performed automatically based on a speed of the vehicle; receiving a shifting request from a user-operated gear shifter to either: (i) upshift the transmission from a current gear to a higher gear; or (ii) downshift the transmission from the current gear to a lower gear; in response to the shifting request, operating the transmission in a semi-automatic mode whereby gear shifting of the transmission is based on user-generated shifting requests; performing the upshift or the downshift of the transmission according to the shifting request; monitoring a speed of an engine of the vehicle; and in response to the speed of the engine being at a mode ending speed, returning operation of the transmission to the automatic mode.

In some embodiments, the method further comprises: prior to performing the upshift or the downshift of the transmission, calculating a predicted speed of an engine of the vehicle if the shifting request were to be fulfilled; in response to the shifting request being for upshifting the transmission and the predicted speed being higher than the lower speed limit of the engine, performing the upshift of the transmission; and in response to the shifting request being for downshifting the transmission and the predicted speed being below the upper speed limit of the engine, performing the downshift of the transmission.

In some embodiments, the method further comprises after performing the upshift or the downshift of the transmission according to the shifting request: maintaining a gear engagement in response to the speed of the engine not being at the mode ending speed.

According to another aspect of the present technology, there is provided a method for controlling an automatic transmission of a vehicle, comprising: determining a torque of an engine of the vehicle; performing at least one transmission operation comprising actuating a clutch of the transmission by increasing or decreasing a pressure of transmission fluid routed to the clutch; during said actuating: determining an input speed of the clutch; determining an output speed of the clutch; determining that the clutch is slipping; while the clutch is slipping, recording the pressure of transmission fluid routed to the clutch; calculating a torque transmitted by the clutch; associating the pressure of the transmission fluid routed to the clutch with the torque transmitted by the clutch to generate a clutch pressure-torque pairing; iteratively recording the clutch pressure-torque pairing for each of a plurality of torque values; continuously calculating an adaptive pressure-torque function of the clutch based on a plurality of the clutch pressure-torque pairings; and controlling the transmission based on the adaptive pressure-torque function of the clutch.

In some embodiments, the clutch is determined to be slipping based at least in part on the input speed and the output speed of the clutch.

In some embodiments, the clutch is determined to be slipping in response to an absolute value of a difference of the input speed of the clutch and the output speed of the clutch being greater than a predetermined value.

In some embodiments, the at least one transmission operation comprises shifting the transmission from a current gear to one of a higher gear and a lower gear.

In some embodiments, the at least one transmission operation comprises launching the vehicle from a stand-still state.

In some embodiments, calculating the adaptive pressure-torque function comprises determining a linear regression corresponding to the plurality of the clutch pressure-torque pairings.

In some embodiments, calculating the adaptive pressure-torque function further comprises determining a kiss point of the clutch based on the linear regression.

In some embodiments, the vehicle is an off-road vehicle; and controlling the transmission based on the adaptive pressure-torque function comprises: during actuation of the clutch, for a given torque value, increasing the pressure of transmission fluid routed to the clutch to a pressure value that is at least 10% greater than a corresponding pressure indicated by the linear regression.

In some embodiments, during actuation of the clutch, for the given torque value, the pressure of transmission fluid routed to the clutch is increased to the pressure value that is between 10% to 20% greater than the corresponding pressure indicated by the linear regression.

In some embodiments, the clutch is a dual-clutch comprising a first clutch and a second clutch; and actuating the clutch comprises: moving one of the first clutch and the second clutch to an engaged position thereof; and moving another one of the first clutch and the second clutch to a disengaged position thereof.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14 is a longitudinal cross-sectional view of a sub-transmission of the dual-clutch transmission of FIG. 3;

DETAILED DESCRIPTION

Figure 1:
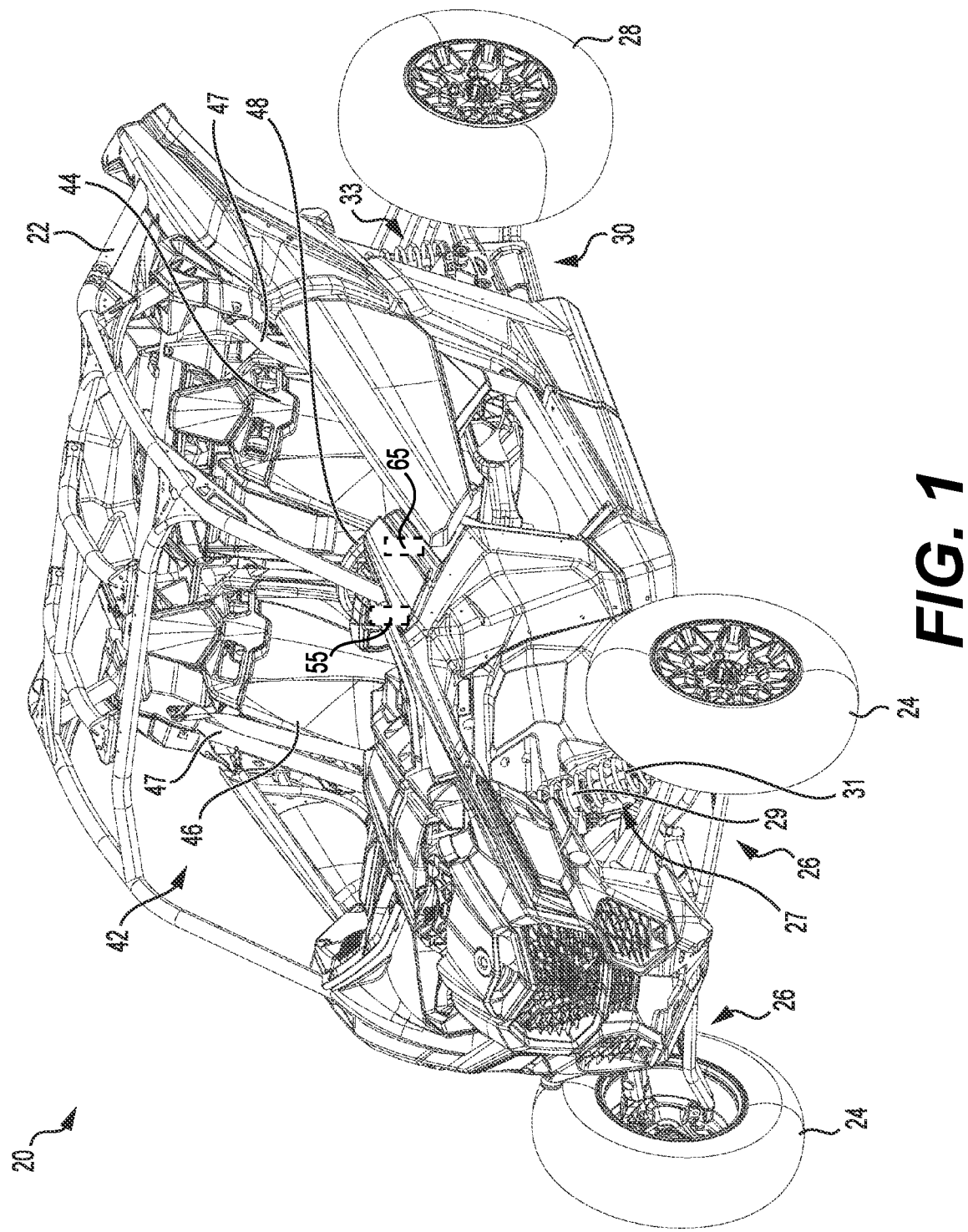
FIG. 1 is a perspective view taken from a top, front, left side of an off-road vehicle.

An automatic transmission 100 will be described herein with respect to a four-wheel side-by-side off-road vehicle 20. In this embodiment, the automatic transmission 100 is a dual-clutch transmission (DCT), but it is contemplated that the DCT 100 could be any other type of automatic transmission in other embodiments. Furthermore, it is contemplated that the DCT 100 could be used in other types of vehicles such as, but not limited to, off-road vehicles having more or less than four wheels and/or more or less than two seats. The general features of the off-road vehicle 20 will be described with respect to FIGS. 1 and 2.

The vehicle 20 has a frame 22, two front wheels 24 connected to a front of the frame 22 by front suspension assemblies 26 and two rear wheels 28 connected to the frame 22 by rear suspension assemblies 30 such as those described in U.S. Pat. No. 9,981,519 B2, dated May 29, 2018. Each front suspension assembly 26 has a front shock absorber assembly 27 including a shock absorber 29 and a spring 31. Each rear suspension assembly 30 has a rear shock absorber assembly 33 including a shock absorber and a spring 37. Ground engaging members other than wheels 24, 28 are contemplated for the vehicle 20, such as tracks or skis. In addition, although four ground engaging members are illustrated in the Figures, the vehicle 20 could include more or less than four ground engaging members. Furthermore, different combinations of ground engaging members, such as tracks used in combination with skis, are contemplated.

The frame 22 defines a central cockpit area 42 inside which are disposed a driver seat 44 and a passenger seat 46. In the present implementation, the driver seat 44 is disposed on the left side of the vehicle 20 and the passenger seat 46 is disposed on the right side of the vehicle 20. However, it is contemplated that the driver seat 44 could be disposed on the right side of the vehicle 20 and that the passenger seat 46 could be disposed on the left side of the vehicle 20. As can be seen in FIG. 1, the vehicle 20 further has a seat belt 47 for each one of the seats 44, 46. A steering wheel 48 is disposed in front of the driver seat 44. The steering wheel 48 is used to turn the front wheels 24 to steer the vehicle 20. Various displays and gauges 50 are disposed in front of the steering wheel 48 to provide information to the driver regarding the operating conditions of the vehicle 20. Examples of displays and gauges 50 include, but are not limited to, a speedometer, a tachometer, a fuel gauge, a transmission position display, and an oil temperature gauge.

Figure 2:
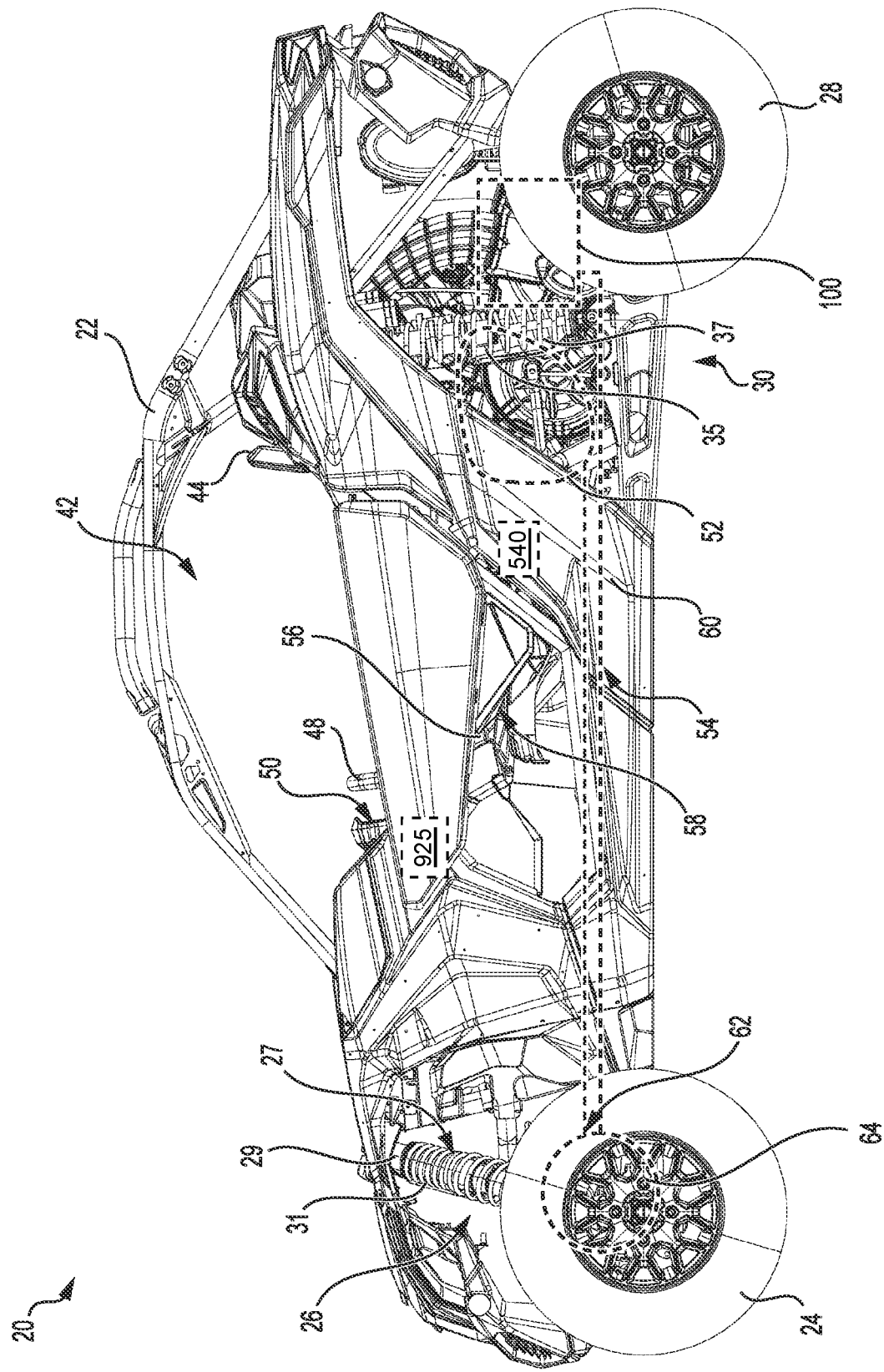
FIG. 2 is a left side elevation view of the off-road vehicle of FIG. 1.
Figure 3:
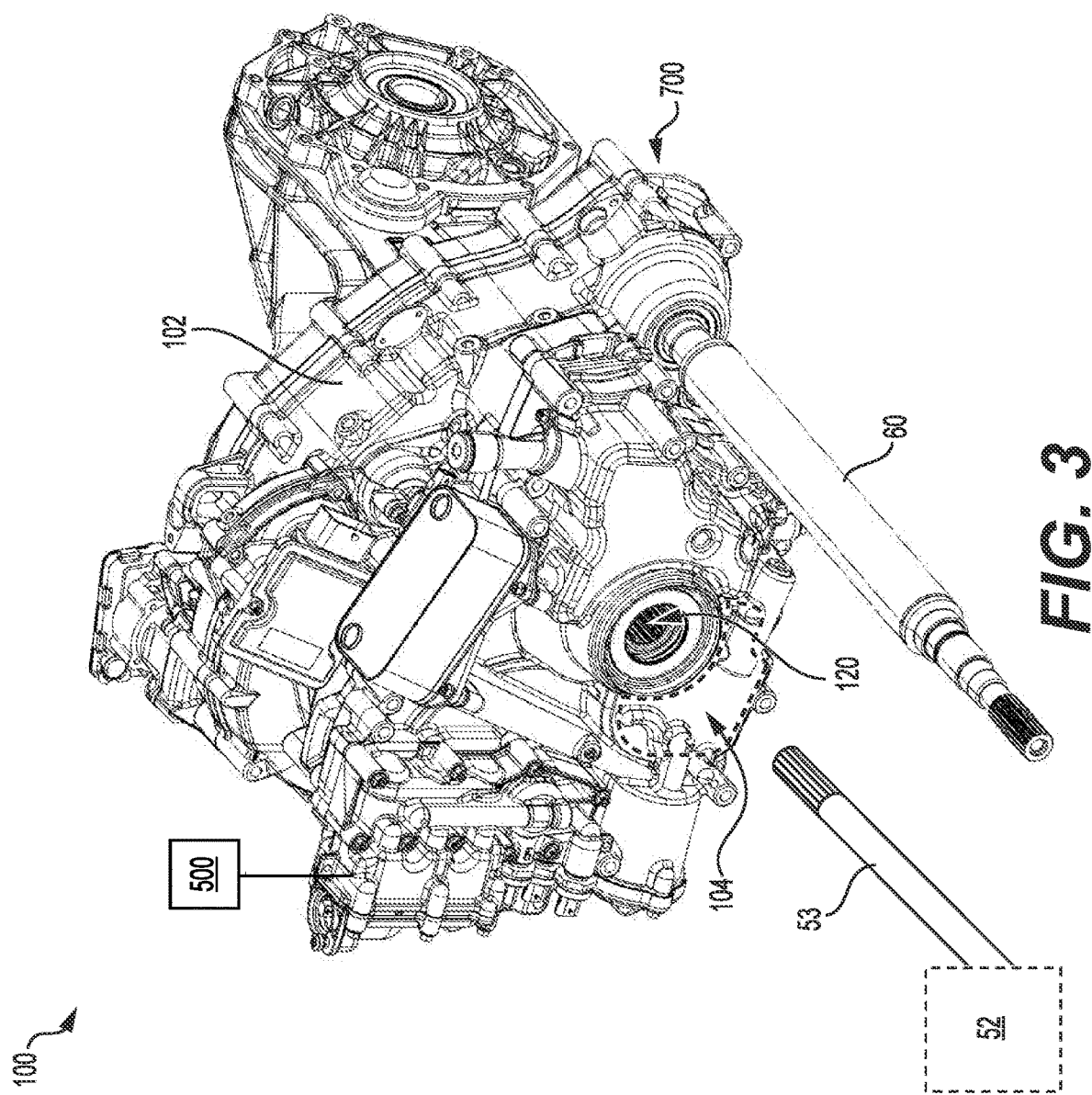
FIG. 3 is a perspective view taken from a top, front, left side of a dual-clutch transmission and front propeller shaft of the vehicle of FIG. 1.

Referring to FIG. 2, an internal combustion engine 52 (schematically shown in FIGS. 2 and 3) is connected to the frame 22 in a rear portion of the vehicle 20. The engine 52 has a crankshaft 53 (schematically shown in FIG. 3) that is connected to the DCT 100 disposed behind the engine 52 (both schematically shown in FIG. 2). The DCT 100 includes a subtransmission 700 (FIGS. 4, 5 and 14) operatively connected to a driveline 54 (schematically shown in FIG. 2) of the vehicle 20 for operatively connecting the front and rear wheels 24, 28 to the engine 52 in order to propel the vehicle 20. A gear shifter 56 (FIG. 2) located between the seats 44, 46 operates the DCT 100 and the subtransmission 700 of the vehicle 20, and enables the driver to select one of a plurality of gear configurations for operation of the vehicle 20. In this embodiment, as schematically illustrated in FIG. 1, the vehicle 20 also has paddle gear shifters 55, 65 mounted to the steering wheel 48 for enabling the driver to select a gear for operation of the vehicle 20 in a semi-automatic operation mode of the DCT 100. The paddle gear shifters 55, 65 include an upshift paddle 55 and a downshift paddle 65. The upshift and downshift paddles 55, 65 could instead be replaced by other types of user-operated gear shifters. In the illustrated implementation of the vehicle 20, the gear configurations made available by the DCT 100 include a reverse gear, and forward first, second, third, fourth, fifth, sixth and seventh gear. The gear configurations made available by the subtransmission 700 include park, neutral, high forward gears, and low forward gears. Thus, the DCT 100 and the subtransmission 700 enable fourteen different forward-going gear configurations and two different reverse gear configurations. It is contemplated that the sequence and/or number of gear configurations could be different than as shown herein in other implementations.

A driving mode selector button 58 (FIG. 2) also enables the driver to select 2×4 or 4×4 operation of the vehicle 20. More particularly, the driveline 54 includes a front propeller shaft 60 which extends horizontally to the left of the engine 52 towards a front differential assembly 62 (schematically shown in FIG. 2). The front differential assembly 62 is operatively connected to the front wheels 24 via front wheel axle assemblies (not shown). The front differential assembly 62 includes an electronic selector 64 (also schematically shown in FIG. 2) operatively connected to the driving mode selector button 58. The electronic selector 64 allows to selectively connect the front propeller shaft 60 to the front wheel axle assemblies to enable 4×4 driving mode of the vehicle 20, or to selectively disconnect the front propeller shaft 60 from the front wheel axle assemblies to enable 2×4 driving mode of the vehicle 20 (i.e. with only the rear wheels 28 propelling the vehicle 20).

The vehicle 20 further includes other components such as brakes, a radiator, headlights, and the like. As it is believed that these components would be readily recognized by one of ordinary skill in the art, further explanation and description of these components will not be provided herein.

Turning now to FIGS. 3 to 14, the DCT 100 will be described in more detail. The DCT 100 includes a housing 102 that is separate from the internal combustion engine 52. The housing 102 is flanged to a rear face of the internal combustion engine 52. In addition, the housing 102 has a dedicated hydraulic and lubrication oil circuit, separated from that of the engine 52. A transmission fluid pump 104 (schematically shown in FIG. 3) is received inside the housing 102. The transmission fluid pump 104 is adapted to selectively pump transmission fluid, such as oil-based fluids. Again, in the present implementation, the transmission fluid pump 104 is separated from any other pump(s) the engine 52 may have.

Figure 4:
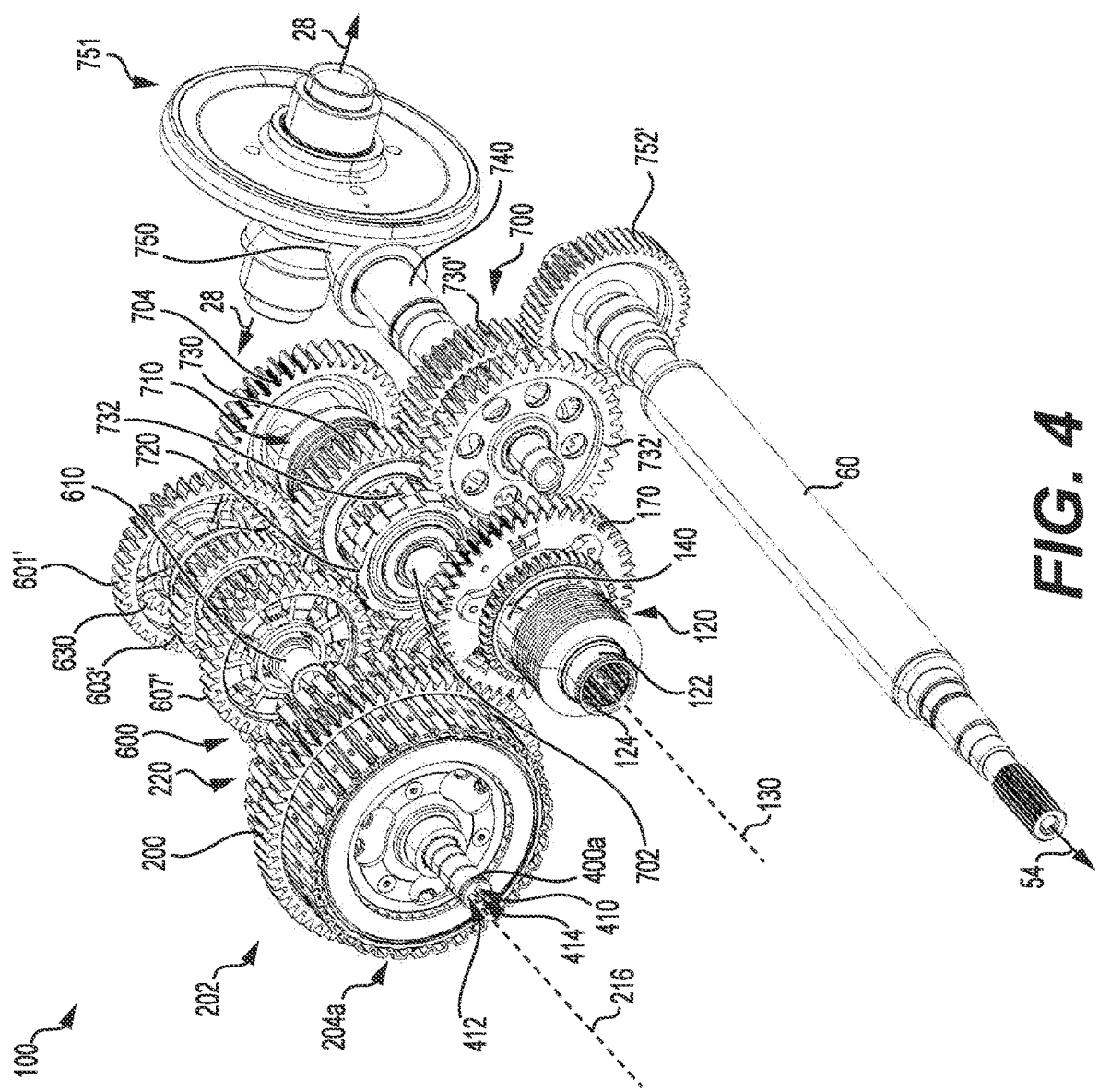
FIG. 4 is a perspective view taken from a top, front, left side of the dual-clutch transmission and front propeller shaft of FIG. 3, with a housing of the dual-clutch transmission removed.
Figure 5:
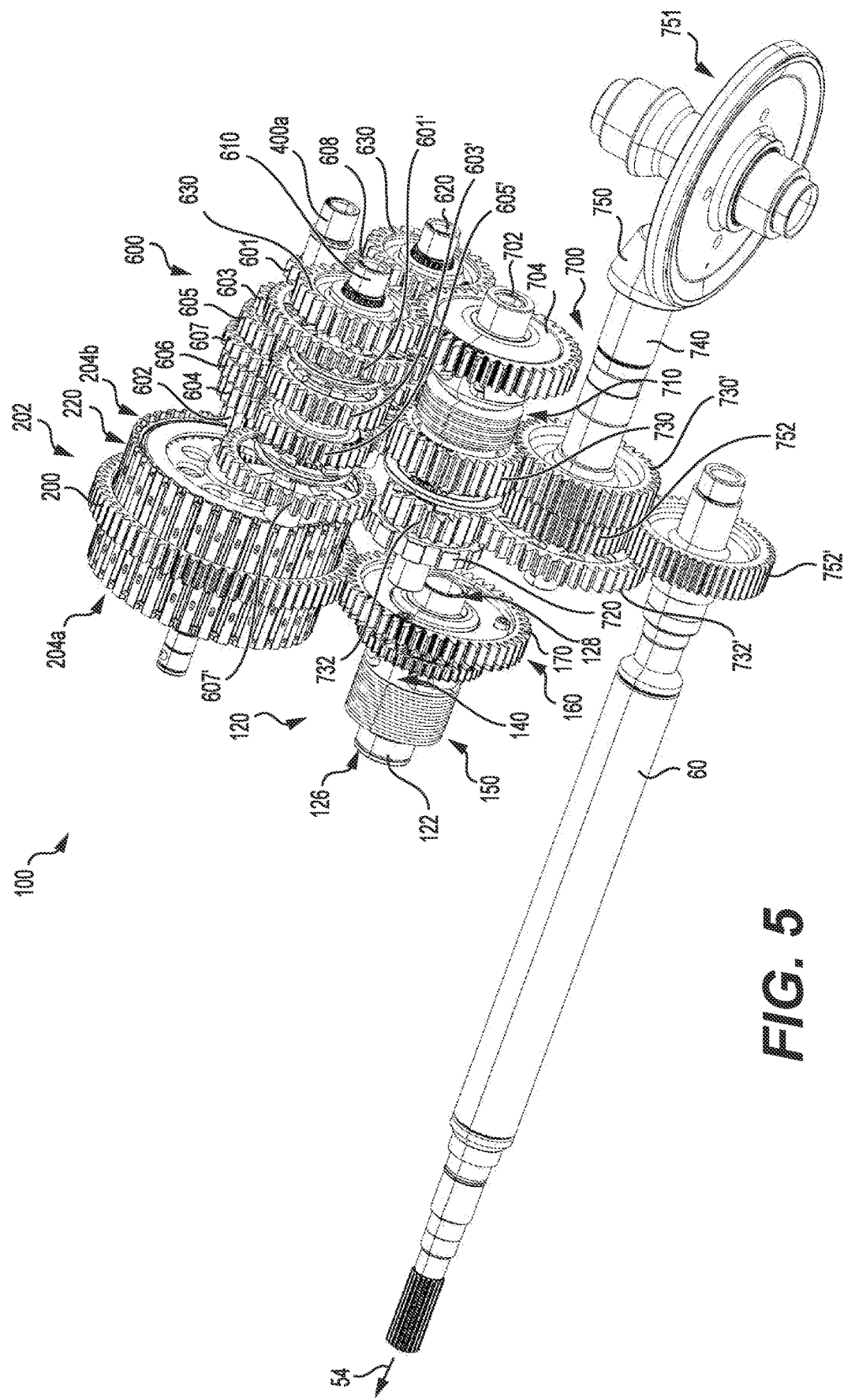
FIG. 5 is a perspective view taken from a top, rear, left side of the dual-clutch transmission and front propeller shaft of FIG. 4.
Figure 6:
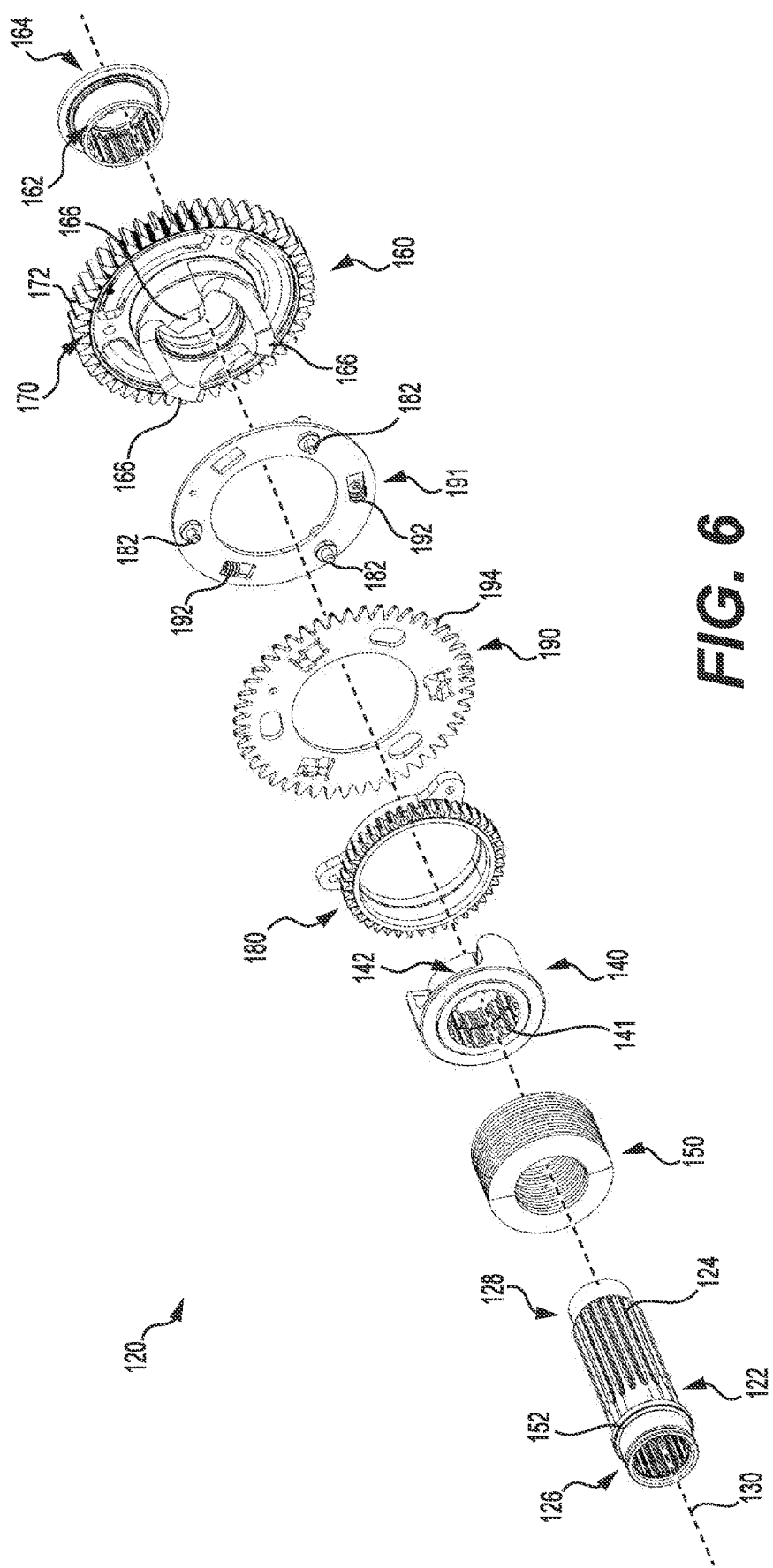
FIG. 6 is an exploded, perspective view taken from a top, front, left side of an input damper of the dual-clutch transmission of FIG. 3.
Figure 8:
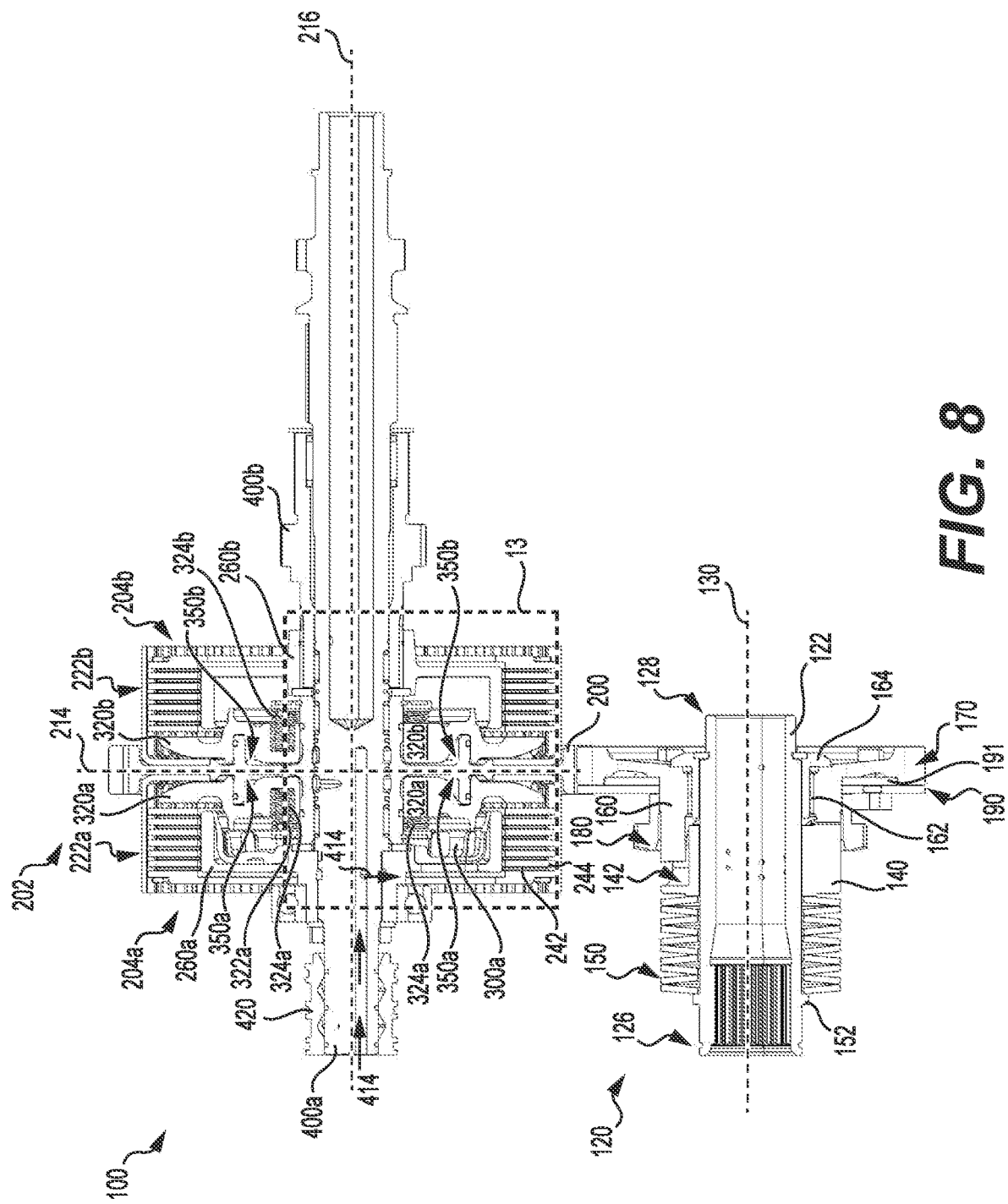
FIG. 8 is a longitudinal cross-sectional view of the dual-clutch and the input damper of the dual-clutch transmission of FIG. 3.

Referring to FIGS. 4 to 6, the DCT 100 includes an input damper 120 adapted to reduce the torque variations from the crankshaft 53 to the DCT 100. The input damper 120 has a hollow shaft 122 defining splines 124 for connection to the crankshaft 53 (as can be understood from FIG. 3). The hollow shaft 122 has a front end 126 and a rear end 128 defined consistently with the forward travel direction of the vehicle 20 (FIGS. 6 and 8). The hollow shaft 122 also defines an input damper axis 130 about which the hollow shaft 122 rotates. An input member 140 is slidably engaged to the hollow shaft 122 and positioned between the front and rear ends 126, 128. The input member 140 has splines 141 complementary to splines 124, and the input member 140 can slide axially along the input damper axis 130 between the front and rear ends 126, 128. The input member 140 defines three recesses 142 angularly displaced by about 120 degrees relative to the input damper axis 130. A disc spring assembly 150 is connected to the hollow shaft 122 and extends between the front and rear ends 126, 128. The disc spring assembly 150 abuts a shoulder 152 of the hollow shaft 122 and biases the input member 140 axially along the input damper axis 130 towards the rear end 128 of the hollow shaft 122. An output member 160 is disposed over the hollow shaft 122 and positioned between the input member 140 and the rear end 128 of the hollow shaft 122. The output member 160 is supported by bearings 162 disposed between the output member 160 and a connector 164 disposed adjacent the rear end 128 of the hollow shaft 122. The connector 164 retains the output member 160 on the hollow shaft 122. The output member 160 defines three cams 166 also angularly displaced by about 120 degrees relative to the input damper axis 130 (FIG. 6). The three cams 166 are structured and configured for engaging the corresponding three recesses 142 of the input member 140 when the input member 140 is biased towards the rear end 128 of the hollow shaft 122. An output gear 170 is connected to the output member 160, and also rotates about the input damper axis 130. The output gear 170 has a plurality of teeth 172. A pump gear 180 is connected to the output gear 170 via three fasteners 182, and extends between the output gear 170 and the disc spring assembly 150. The pump gear 180 also rotates about the input damper axis 130. The pump gear 180 is adapted to drive the transmission fluid pump 104 (FIG. 2). An auxiliary output gear 190 is connected to the output gear 170 via a ring 191 having coil spring assemblies 192. The auxiliary output gear 190 is biased by the coil spring assemblies 192 and has a plurality of teeth 194. In the present implementation, the number of teeth 172 of the output gear 170 matches the number of teeth 194 of the auxiliary output gear 190. The coil spring assemblies 192 permits angular displacements of the auxiliary output gear 190 about the input damper axis 130 relative to the output gear 170. The auxiliary output gear 190 provides preload on the teeth 172 of the output gear 170 and reduces backlash that can occur between the output gear 170 and a central clutch gear 200 described below.

Figure 7:
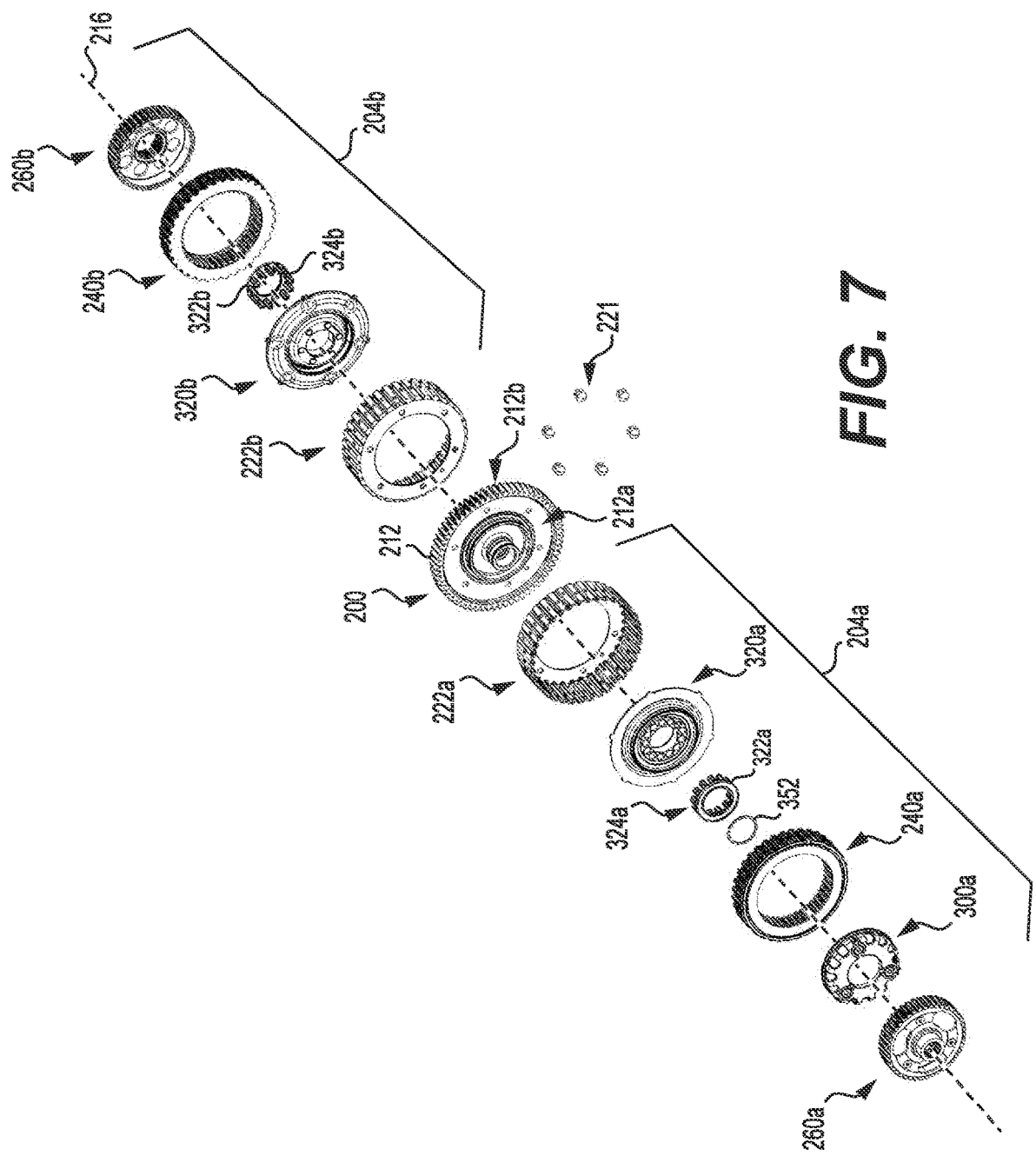
FIG. 7 is an exploded, perspective view taken from a top, front, left side of a dual-clutch of the dual-clutch transmission of FIG. 3.
Figure 9:
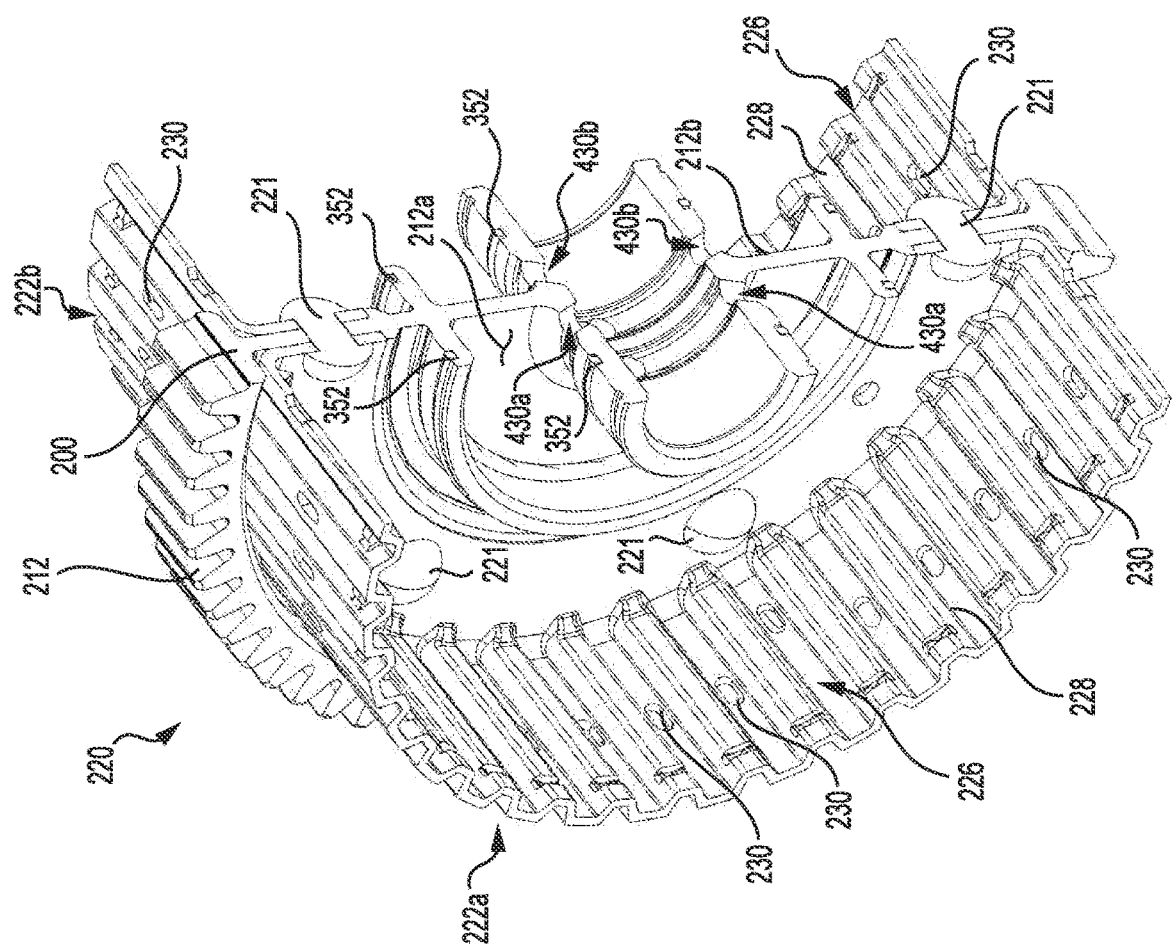
FIG. 9 is a perspective, longitudinal cross-sectional view of the clutch pack drum and the central clutch gear of the dual-clutch of FIG. 7.

Referring to FIGS. 4 to 8, the DCT 100 includes a dual-clutch 202 having first and second clutches 204a, 204b. Before describing in details the first and second clutches 204a, 204b, components of the dual clutch 202 will be described. The dual clutch 202 includes a clutch pack drum 220 that is adapted to rotate inside the housing 102, and the central clutch gear 200 is connected to the clutch pack drum 220 via fasteners 221 (FIGS. 7 and 9). The central clutch gear 200 has teeth 212 adapted to mesh with the teeth 172, 194 of the output gear 170 and the auxiliary output gear 190. The central clutch gear 200 is thus operatively connected to the crankshaft 53 of the internal combustion engine 52 via the input damper 120. It is to be noted that having the input damper 120 located outside the clutch pack drum 220 offers more flexibility to package the DCT 100 in the rear portion of the frame 22 of the vehicle 20 supporting the engine 52 and the DCT 100. Thus, having the input damper 120 located outside the clutch pack drum 220 improves the overall packaging of the DCT 100 in the rear portion of the vehicle 20. Moreover, having the input damper 120 located outside the clutch pack drum 220 allows for a greater angle of relative rotation between the input member 140 and the output member 160 compared to an input damper that would be integrated in the clutch pack drum 220. The greater angle of relative rotation between the input member 140 and the output member 160 improves the damping provided by the input damper 120.

Referring to FIGS. 7 and 9, the central clutch gear 200 has a front face 212a and a rear face 212b. The central clutch gear 200 defines a clutch gear plane 214 and a clutch gear rotation axis 216 normal to the clutch gear plane 214 (FIG. 8). It is to be appreciated that the clutch gear rotation axis 216 is parallel to the input damper axis 130, and extends above and to the right of the input damper axis 130 (FIG. 4).

Referring to FIGS. 7 to 9, the clutch pack drum 220 includes a front clutch pack basket 222a disposed in front of the central clutch gear 200, and a rear clutch pack basket 222b disposed behind the central clutch gear 200. The front and rear clutch pack baskets 222a, 222b are interconnected using the fasteners 221 extending through the central clutch gear 200. The front and rear clutch pack baskets 222a, 222b are identical. In some implementations, the front and rear clutch pack baskets 222a, 222b are symmetrical about the clutch gear plane 214. The front and rear clutch pack baskets 222a, 222b could be structured otherwise in other implementations. Having the front and rear clutch pack baskets 222a, 222b identical, or symmetrical about the clutch gear plane 214, assists in reducing the manufacturing costs of the DCT 100. The front and rear clutch pack baskets 222a, 222b each have a cylindrical wall 226 defining splines 228 and a plurality of holes 230.

Turning now to FIGS. 7 to 13C, the first clutch 204a will be described in details first. The operation of the first and second clutches 204a, 204b, and the flow of fluid through the DCT 100 will be described further below. A front clutch pack 240a is received in the clutch pack basket 222a and is disposed in front of the central clutch gear 200. The clutch pack 240a includes a plurality of clutch plates 242 having teeth 244 extending away from the clutch gear rotation axis 216 and engaging the splines 228 of the clutch pack basket 222a for rotating with the clutch pack drum 220 (FIG. 13A). The clutch plates 242 are movable axially in a direction 246 (see double arrow 246 in FIGS. 13A to 13C) defined by the clutch gear rotation axis 216. The clutch plates 242 have disc surfaces including relatively low friction material. The front clutch pack 240a further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216. The clutch disks 250 are also movable axially in the direction 246 defined by the clutch gear rotation axis 216. As will become apparent from the description below, when the clutch disks 250 are selectively engaged by the clutch plates 242, the clutch disks 250 rotate with the clutch pack drum 220.

Figure 10:
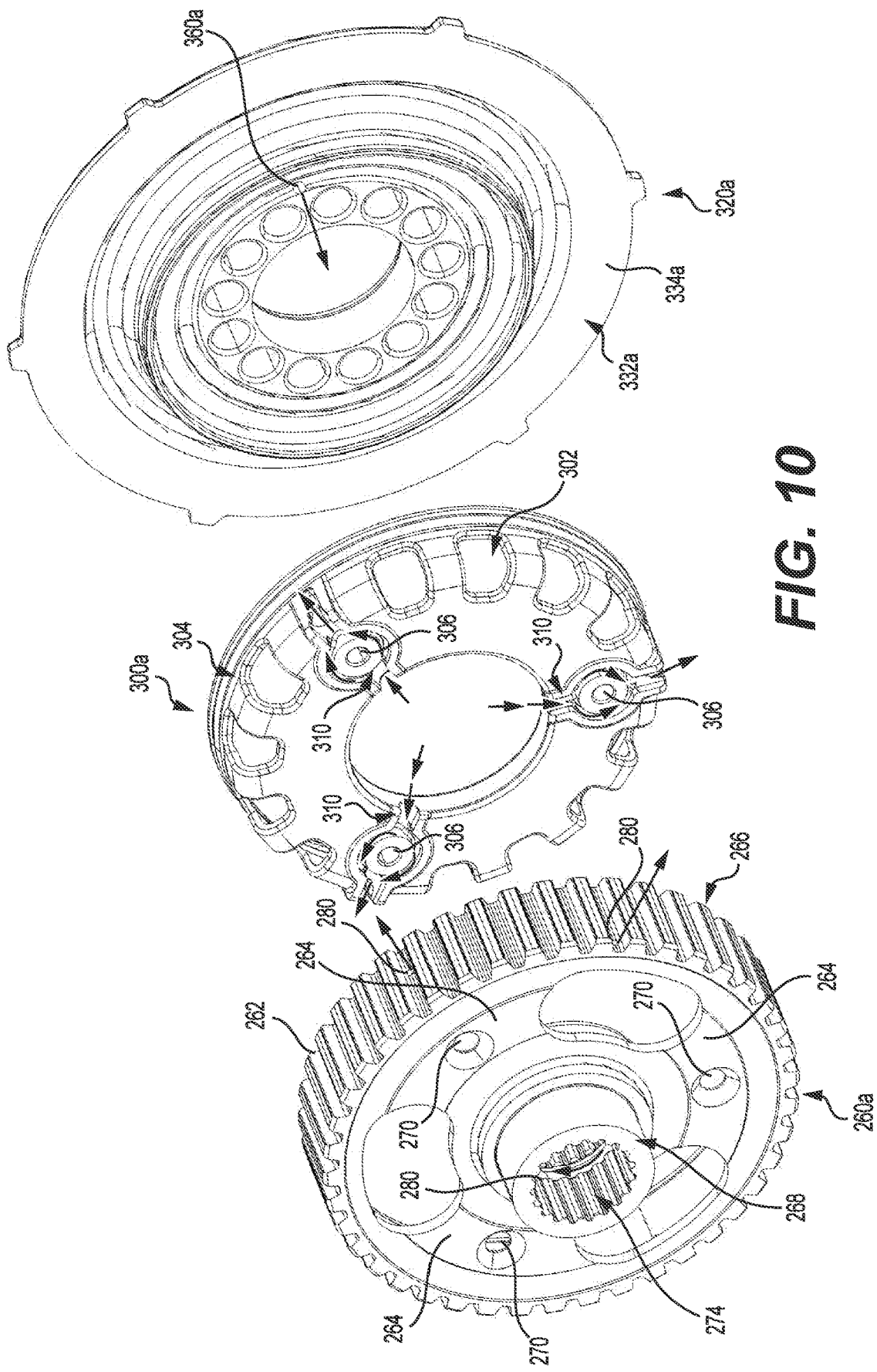
FIG. 10 is an exploded, perspective view taken from a top, front, left side of the front clutch hub, front lubrication cover and front pressure plate of the dual-clutch of FIG. 7.
Figure 11:
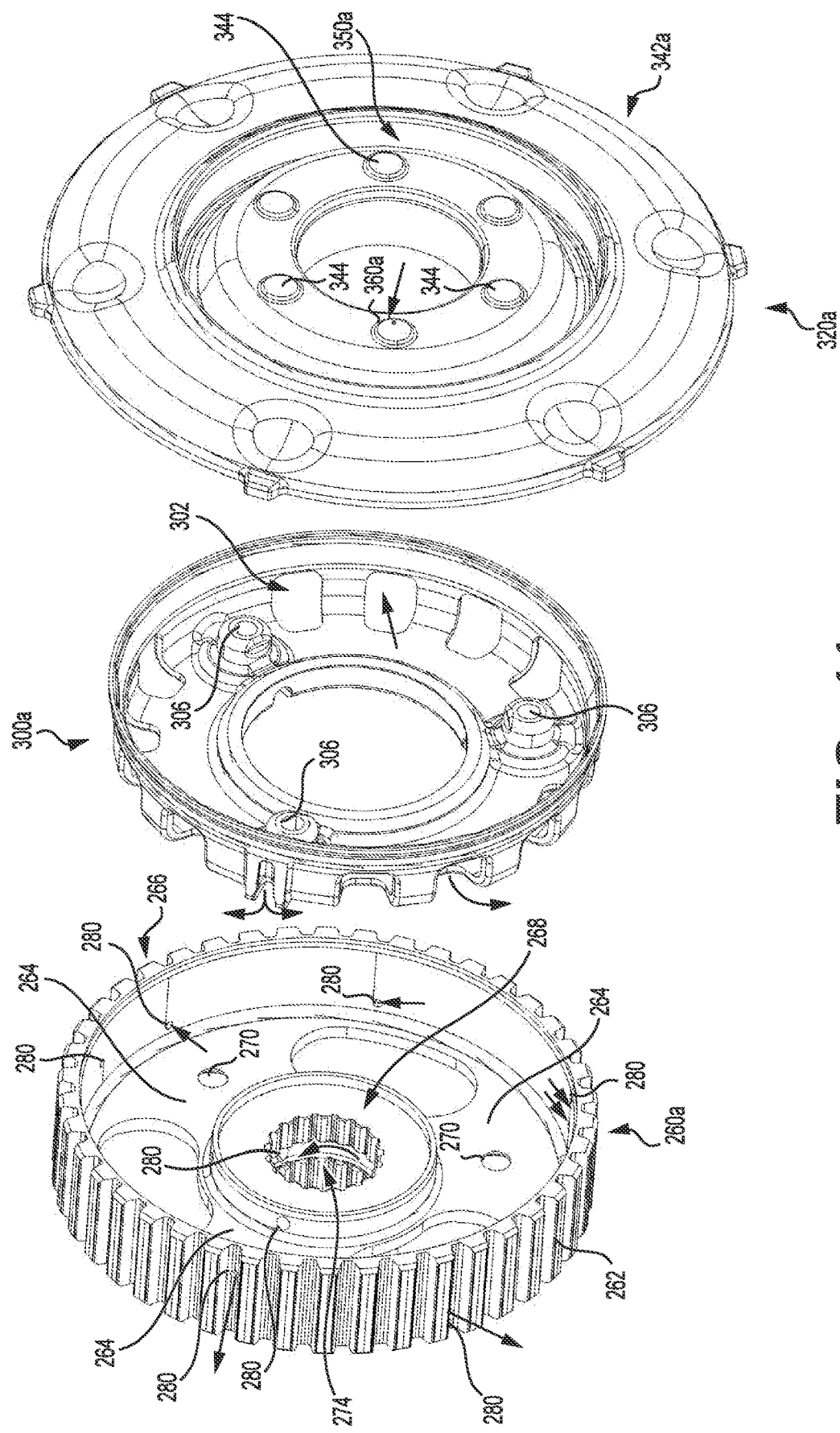
FIG. 11 is an exploded, perspective view taken from a rear, left side of the front clutch hub, front lubrication cover and front pressure plate of the dual-clutch of FIG. 7.
Figure 13A:
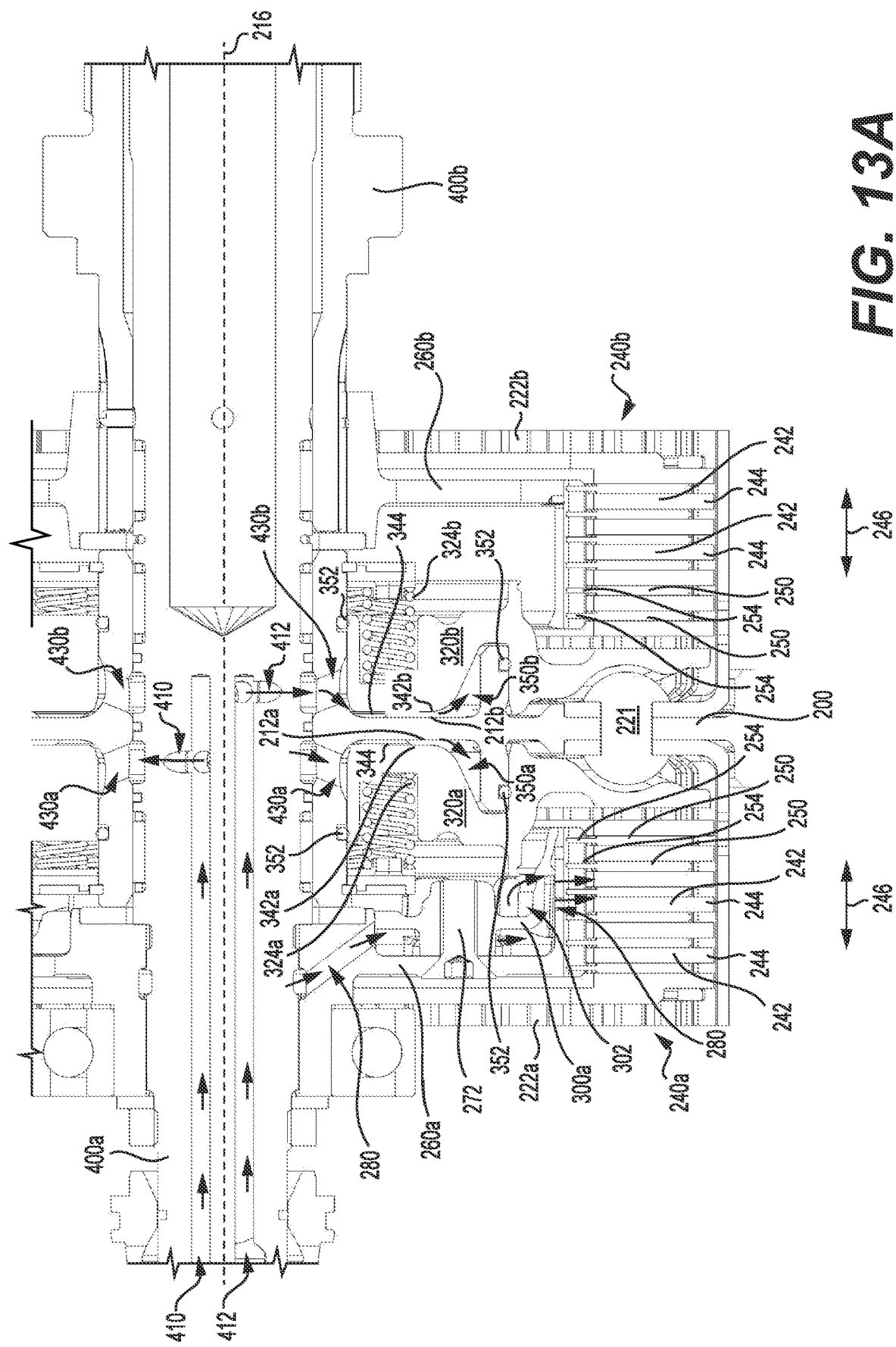
FIG. 13A is a close-up view of portion 13 of FIG. 8, with the front and rear pressure plates abutting the central clutch gear of the dual-clutch of FIG. 7.

Referring to FIGS. 7, 10 and 11, a front clutch hub 260a is received in the clutch pack 240a and is disposed in front of the central clutch gear 200. The clutch hub 260a defines splines 262 structured to engage with the teeth 254 of the clutch disks 250 of the clutch pack 240a. The clutch disks 250 are movable axially relative to the clutch hub 260a in the direction 246 defined by the clutch gear rotation axis 216 as the teeth 254 slide axially in the splines 262. When the clutch disks 250 are selectively engaged by the clutch plates 242, the clutch hub 260a rotates with the clutch pack drum 220. The clutch hub 260a has three arms 264 connecting a rim portion 266 of the clutch hub 260a (defining the splines 262) to a central portion 268 of the clutch hub 260a. Holes 270 are defined in each of the arms 264 for receiving fasteners 272 (FIG. 13A). The central portion 268 defines splines 274. Referring to FIGS. 10, 11 and 13A, a plurality of bores 280 are defined in the central portion 268, in the arms 264 and in the rim portion 266. The bores 280 are adapted for allowing flow of fluid therethrough, as will become apparent from the following description.

Referring to FIGS. 10 and 11, a lubrication cover 300a is also received in the clutch pack 240a. The lubrication cover 300a is disposed in front of the central clutch gear 200 and behind the front clutch hub 260a. The lubrication cover 300a defines a plurality of apertures 302 on a rim portion 304 thereof. Three threaded holes 306 are defined in the lubrication cover 300a for receiving the fasteners 272. When the fasteners 272 extend through the holes 270 of the clutch hub 260a and are engaged in the threaded holes 306 of the lubrication cover 300a, the lubrication cover 300a and the clutch hub 260a are interconnected. Passages 310 are defined in the lubrication cover 300a and extend around each one of the threaded holes 306. The passages 310 are adapted for allowing flow of fluid therethrough, as will become apparent from the following description.

Figure 13B:
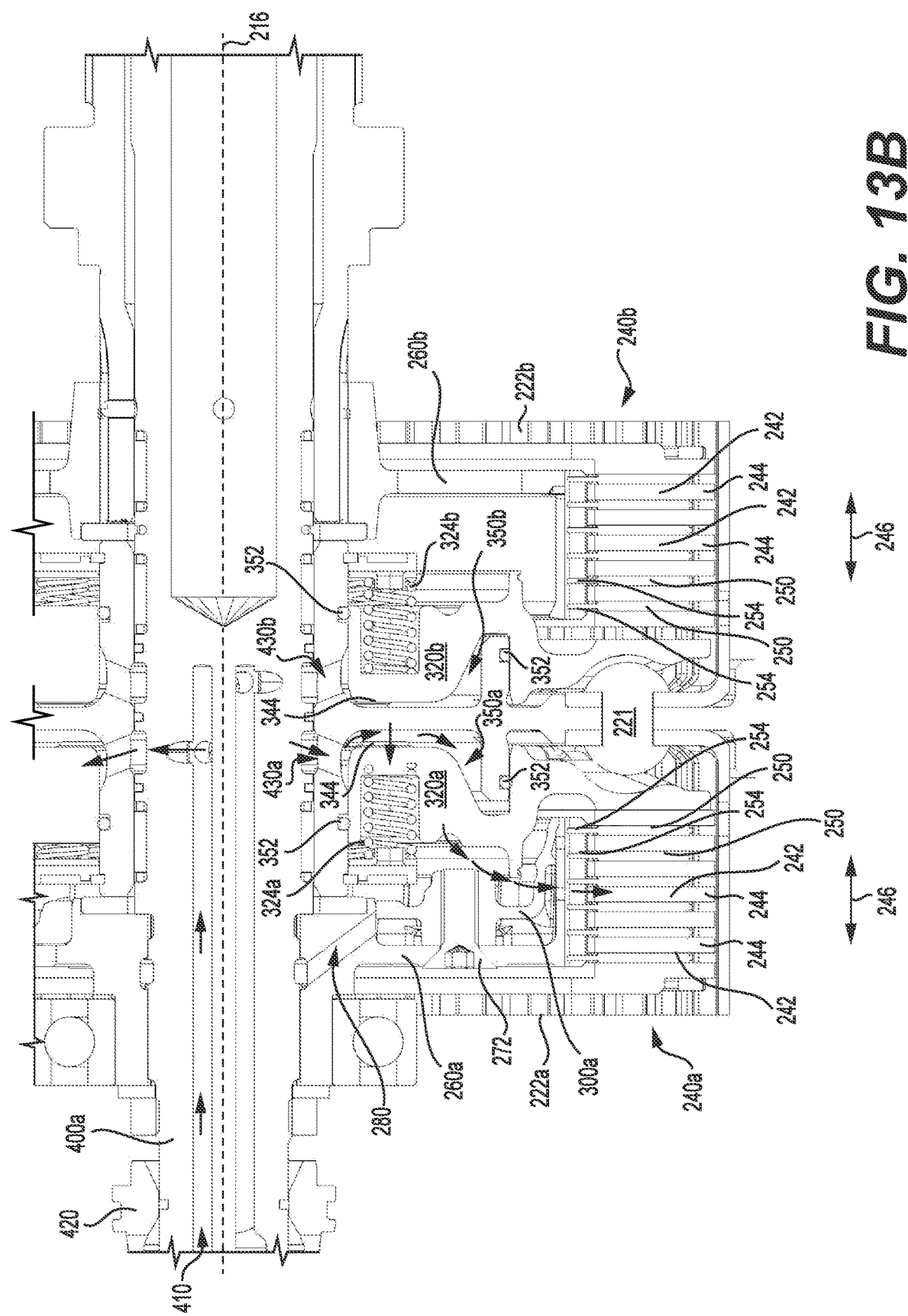
FIG. 13B is a close-up view of portion 13 of FIG. 8, with the front pressure plate being moved axially away from the central clutch gear of the dual-clutch of FIG. 7, and with the rear pressure plate abutting the central clutch gear.
Figure 13C:
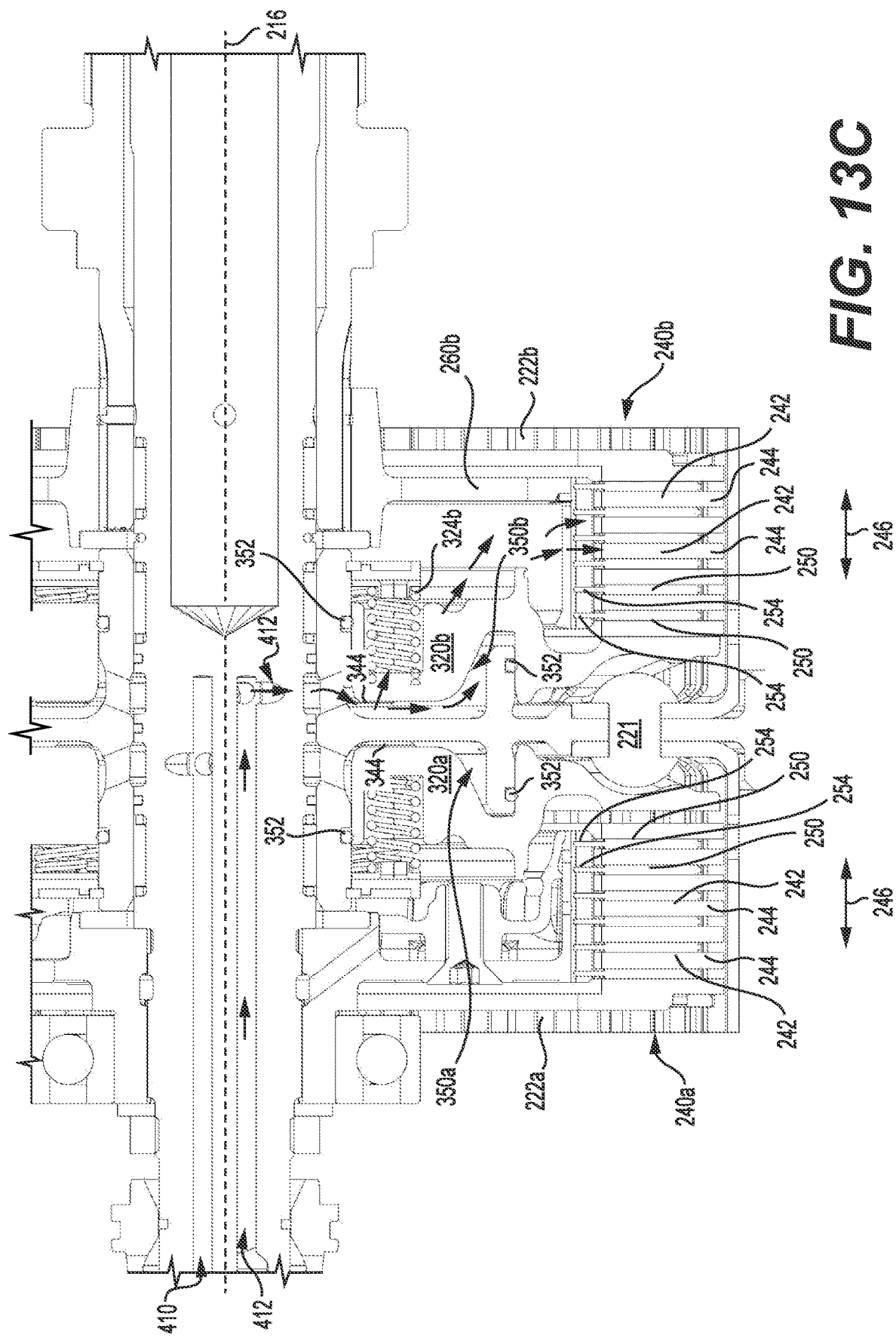
FIG. 13C is a close-up view of portion 13 of FIG. 8, with the rear pressure plate being moved axially away from the central clutch gear of the dual-clutch of FIG. 7, and with the front pressure plate abutting the central clutch gear.

Referring to FIGS. 7, 10, 11 and 13A, the DCT 100 further includes a pressure plate 320a disposed in front of the central clutch gear 200. The pressure plate 320a is disposed between the central clutch gear 200 and the lubrication cover 300a. A ring 322a is connected to the central clutch gear 200, and coil spring assemblies 324a interconnect the pressure plate 320a to the central clutch gear 200. The pressure plate 320a rotates with the central clutch gear 200, and is movable axially in the direction 246 upon compression and extension of the coil spring assemblies 324a. The pressure plate 320a has a front face 332a (FIG. 10) including a rim portion 334a. The rim portion 334a of the pressure plate 320a is structured to selectively engage the clutch plate 242 that is closest to the central clutch gear 200. The pressure plate 320a further has a rear face 342a (FIG. 11) where six pads 344 project therefrom. The pads 344 are structured for abutting the front face 212a of the central clutch gear 200 and to leave a spacing between the front face 212a of the central clutch gear 200 and the rear face 342a of the pressure plate 320a (the spacing is shown in FIG. 13A). Referring to FIGS. 13A to 13C, a chamber 350a is defined between the front face 212a of the central clutch gear 200 and the rear face 342a of the pressure plate 320a. Seals 352 are disposed between the pressure plate 320a and the central clutch gear 200 to prevent fluid from escaping the chamber 350a through the regions where the seals 352 extend. The pressure plate 320a further defines a pressure plate passage 360a extending between the front face 332a and the rear face 342a. More particularly, the pressure plate passage 360a starts on the rear face 342a from one of the pads 344 (FIG. 11). The pressure plate passage 360a is adapted for allowing flow of fluid therethrough, as will become apparent from the following description.

Referring to FIGS. 4, 8, and 13A, a shaft 400a is connected to the front clutch hub 260a via teeth (not shown) engaging the splines 274 of central portion 268. The shaft 400a is coaxial with the clutch gear rotation axis 216. The shaft 400a defines three passages 410, 412 (FIG. 13A), and 414 (FIG. 8) adapted for flowing fluid therethrough. A manifold 420 (FIG. 8) is connected to the front portion of the shaft 400a. The manifold 420 fluidly connects the transmission fluid pump 104 to the passages 410, 412, 414. Three plugs (not shown) seal the ends of the passages 410, 412, 414 defined in the front portion of the shaft 400a (FIG. 4). Referring to FIGS. 4, 5 and 14, a plurality of transmission gears 600 are operatively connected to the shaft 400a. The transmission gears 600 include the gears corresponding to the first gear 601, third gear 603, fifth gear 605, and seventh gear 607 of the DCT 100. The transmission gears 600 are all disposed behind the central clutch gear 200.

Arrows show the flow of fluid through the dual-clutch 202 in FIGS. 10, 11, 13A and 13B when the dual-clutch 202 rotates. When fluid is selectively supplied in the passage 410 from the transmission fluid pump 104, fluid flows through the shaft 400a in the passage 410 (FIG. 13A), through passages 430a defined in the central clutch gear 200 (FIGS. 9 and 13A) and into the chamber 350a. Since the pads 344 abut the front face 212a of the central clutch gear 200, fluid flows through the spacing between the pressure plate 320a and the central clutch gear 200, and fills the chamber 350a. The pads 344 are thus structured for selectively allowing flow of fluid from the passage 410 to the chamber 350a. When the fluid is selectively supplied with sufficient pressure by the transmission fluid pump 104, the pressurized fluid in the chamber 350a overcomes the biasing force of the coil spring assemblies 324a and moves the pressure plate 320a axially away from the central clutch gear 200 (i.e. forward of the central clutch gear 200), as shown between FIGS. 13A and 13B. The pressure plate 320a selectively squeezes the clutch plates 242 and the clutch disks 250 together for engaging the clutch plates 242 with the clutch disks 250. The front clutch hub 260a and the lubrication cover 300a are thus rotatable with the clutch pack drum 220 and the central clutch gear 200, and the shaft 400a drives the transmission gears 600 corresponding to the first gear 601, third gear 603, fifth gear 605 and seventh gear 607 of the DCT 100.

Referring to FIG. 13B, as some of the fluid escapes the chamber 350a through the pressure plate passage 360a (as shown by the arrows in FIG. 13B), fluid flows in the front clutch pack 240a and lubricates and cools the clutch plates 242, the clutch disks 250, and the clutch pack basket 222a, as shown by arrows in FIG. 13B. Fluid flows through the holes 230 of the clutch pack basket 222a, is collected in the housing 102 and is returned to the transmission fluid pump 104 for recirculation in the DCT 100. It is thus to be understood that in order for the pressure plate 320a to selectively squeeze the clutch pack 240a, pressurized fluid is continuously supplied in the chamber 350a by the transmission fluid pump 104.

Referring to FIG. 13A, when fluid is selectively supplied in the passage 414 (FIG. 8) and as the first clutch 204a rotates, fluid flows through the shaft 400a, through the bores 280 defined in the central portion 268, in the arms 264 and in the rim portion 266 of the front clutch hub 260a, and through the aperture 302 and passages 310 defined in the lubrication cover 300a, and on to the front clutch pack 240a, as shown by arrows in FIG. 13A. The fluid flowing through the passage 414 provides additional lubrication and cooling to the clutch plates 242, the clutch disks 250, and the clutch pack basket 222a of the first clutch 204a. Since the first clutch 204a is operatively connected to the transmission gear 600 corresponding to the first gear 601 of the DCT 100, which can have a heavy usage, for example, when the vehicle 20 launches repetitively, additional lubrication and cooling to the first clutch 204a provided by fluid flowing through the passage 414 and the bore 280 is advantageous under certain conditions.

Figure 12:
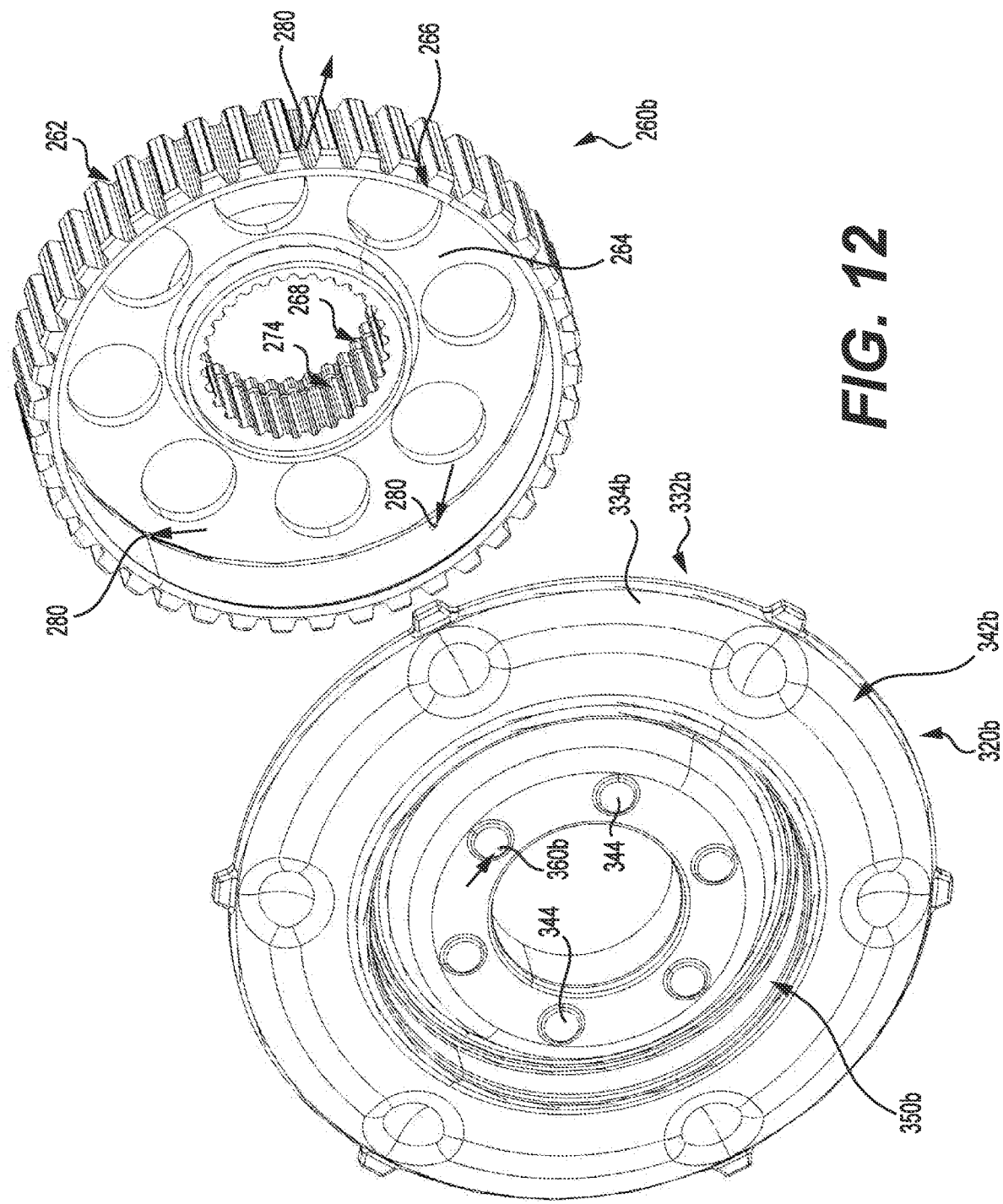
FIG. 12 is an exploded, perspective view taken from a top, front, left side of the rear pressure plate and rear clutch hub of the dual-clutch of FIG. 7.

Referring to FIGS. 7, 8 and 12, the second clutch 204b will now be described. A rear clutch pack 240b is received in the clutch pack basket 222b and is disposed behind the central clutch gear 200. The rear clutch pack 240b also includes a plurality of clutch plates 242 having teeth 244 extending away from the clutch gear rotation axis 216 and engaging the splines 228 of the clutch pack basket 222b for rotating with the clutch pack drum 220 (FIGS. 13A to 13C). In the present implementations, the front and rear clutch packs 240a, 240b are identical, but they could be structured otherwise in other implementations. This feature assists in reducing the manufacturing costs of the DCT 100. The clutch plates 242 have disc surfaces including a relatively low friction material. The rear clutch pack 240b further includes a plurality of clutch disks 250 disposed alternatingly with the clutch plates 242 in the direction 246 (FIG. 13A). The clutch disks 250 have disc surfaces including a relatively high friction material. The clutch disks 250 have teeth 254 extending towards the clutch gear rotation axis 216 (FIGS. 13A to 13C). The clutch disks 250 are also movable axially in the direction 246 defined by the clutch gear rotation axis 216.

Referring to FIGS. 7 and 12, a rear clutch hub 260b is received in the clutch pack 240b and is disposed behind the central clutch gear 200. The clutch hub 260b also defines splines 262 structured to engage with the teeth 254 of the clutch disks 250 of the clutch pack 240b. The clutch disks 250 are movable axially relative to the clutch hub 260b in the direction 246 (FIGS. 13A to 13C). When the clutch disks 250 are selectively engaged by the clutch plates 242, the clutch hub 260b rotates with the clutch pack drum 220. The clutch hub 260b has eight arms 264 connecting a rim portion 266 of the clutch hub 260b to the central portion 268 of the clutch hub 260b. The central portion 268 defines splines 274. Referring to FIG. 12, a plurality of bores 280 are also defined in the central portion 268, in the arms 264 and in the rim portion 266 of the clutch hub 260b. The bores 280 are adapted for allowing flow of fluid therethrough, as will become apparent from the following description.

Referring to FIGS. 7 and 12, the DCT 100 further includes a pressure plate 320b disposed behind the central clutch gear 200. The pressure plate 320b is disposed between the central clutch gear 200 and the clutch hub 260b. A ring 322b (FIG. 7) is connected to the central clutch gear 200, and coil spring assemblies 324b interconnect the pressure plate 320b to the central clutch gear 200. It is to be noted that the rings 322a, 322b are identical, and that the spring assemblies 324a, 324b are identical. These features assist in reducing the manufacturing costs of the DCT 100. The pressure plate 320b rotates with the central clutch gear 200, and is movable axially in the direction 246 upon compression and extension of the coil spring assemblies 324b. The pressure plate 320b has a rear face 332b including a rim portion 334b. The rim portion 334b of the pressure plate 320a is structured to selectively engage the clutch plate 242 of the rear clutch pack 240b that is closest to the central clutch gear 200. The pressure plate 320b further has a front face 342b where six pads 344 project therefrom. The pads 344 are structured for abutting the rear face 212b of the central clutch gear 200 and to leave a spacing defined between the rear face 212b of the central clutch gear 200 and the front face 342b of the pressure plate 320b (FIG. 13A). A chamber 350b is defined between the rear face 212b of the central clutch gear 200 and the front face 342b of the pressure plate 320b. Seals 352 are also disposed between the pressure plate 320b and the central clutch gear 200 to prevent fluid from escaping the chamber 350b through the regions where the seals 352 extend. The pressure plate 320b further defines a pressure plate passage 360b (FIG. 12) extending between the rear face 332b and the front face 342b. More particularly, the pressure plate passage 360b starts on the front face 342b from one of the pads 344. The pressure plate passage 360b is adapted for allowing flow of fluid therethrough, as will become apparent from the following description.

It is to be appreciated that in the illustrated implementation, the pressure plates 320a, 320b are identical. In some implementations, the pressure plates 320a, 320b are symmetrical about the clutch gear plane 214. These features assist in reducing the manufacturing costs of the DCT 100. Furthermore, there is no component similar to the lubrication cover 300a in the second clutch 204b.

Referring to FIGS. 13A to 13C, arrows show the flow of fluid through the dual-clutch 202 when the dual-clutch 202 rotates and fluid is selectively supplied in the passages 410, 412, 414. When fluid is selectively supplied in the passage 412 of the shaft 400a, fluid flows through the shaft 400a in the passage 412 (FIGS. 13A and 13C), through passages 430b defined in the central clutch gear 200 (FIG. 9) and into the chamber 350b. Since the pads 344 abut the rear face 212b of the central clutch gear 200, fluid flows through the spacing between the pressure plate 320b and the central clutch gear 200, and fills the chamber 350b. The pads 344 are thus structured for selectively allowing flow of fluid from the passage 412 to the chamber 350b. When the fluid is selectively supplied with sufficient pressure, the pressurized fluid in the chamber 350b overcomes the biasing force of the coil spring assemblies 324b and moves the pressure plate 320b axially away from the central clutch gear 200 (i.e. rearward of the central clutch gear 200), as shown between FIGS. 13A and 13C. The pressure plate 320b selectively squeezes the clutch plates 242 and the clutch disks 250 together for engaging the clutch plates 242 with the clutch disks 250. The rear clutch hub 260b is thus rotatable with the clutch pack drum 220 and the central clutch gear 200. As some of the fluid escapes the chamber 350b through the pressure plate passage 360b, fluid flows in the rear clutch pack 240b and lubricates and cools the clutch plates 242, the clutch disks 250, and the clutch pack basket 222b, as shown by arrows in FIG. 13C. Fluid flows through the holes 230 of the clutch pack basket 222b, is collected in the housing 102 and is returned to the transmission fluid pump 104 for recirculation in the DCT 100. It is thus to be understood that in order for the pressure plate 320b to selectively squeeze the clutch pack 240b, pressurized fluid is continuously supplied by the transmission fluid pump 104.

Furthermore, it is to be noted that in the DCT 100 of the present technology, having the central clutch gear 200 between the pressure plates 320a, 320b, and thus the chambers 350a, 350b on either side of the central clutch gear 200, assists in distributing the forces more evenly in the clutch pack drum 220. This feature also assists in reducing the rotating masses in the clutch pack drum 220.

Referring to FIG. 8, a hollow shaft 400b is connected to the rear clutch hub 260b via the splines 274 defined in the central portion 268 thereof. The shaft 400a extends through the shaft 400b. Another plurality of transmission gears 600 are operatively connected to the shaft 400b. Referring to FIG. 5, the transmission gears 600 include the gears corresponding to the second gear 602, fourth gear 604 and sixth gear 606 of the DCT 100, and the transmission gears 600 are also disposed behind the central clutch gear 200.

Referring back to FIGS. 4 and 5, the DCT 100 further includes a layshaft 610 having additional transmission gears 601', 603', 605', 607' operatively connected thereto. Each of the transmission gears 601', 603', 605', 607' on the layshaft 610 is selected to have a gear ratio with the corresponding transmission gear 601, 603, 605, 607 to correspond to the first, third, fifth and seventh gear of the DCT 100. The DCT 100 further includes another layshaft 620 having additional transmission gears (not shown) operatively connected thereto. Each of the transmission gears on the layshaft 620 is selected to have a gear ratio with the corresponding transmission gear 602, 604, 606 to correspond to the second, fourth and sixth gear of the DCT 100. The layshaft 620 further includes the transmission gear 608 corresponding to a reverse gear of the DCT 100. An output gear 630 is operatively connected to each of the layshafts 610, 620 to operatively connect the transmission gears 600 to the subtransmission 700. The DCT 100 further includes synchronizers, shift actuators and shift forks adapted to preselect an odd transmission gear on the shaft 400a while the vehicle 20 is being driven in an even transmission gear on the shaft 400b (and vice versa), and thus enable the driver to operate transmission gear changes when the driver operates the gear shifter 56.

Referring now to FIGS. 4, 5 and 14, the subtransmission 700 will be described in more details. The subtransmission 700 has an input shaft 702. An input gear 704 is operatively connected to the input shaft 702 via an output damper 710. The input gear 704 is selectively driven by the output gear 630 of the layshaft 610, or by the output gear 630 of the layshaft 620, depending on the transmission gear that is selected. The output damper 710 is operatively connected between the input gear 704 and the input shat 702. The output damper 710 has components similar to the input damper 120, and can reduce backlash that can occur between the driveline 54 of the vehicle 20 and the DCT 100. A parking lock gear 720 is operatively connected to the input shaft 702, and is adapted to lock the subtransmission 700, and thus the vehicle 20, when selected. The subtransmission 700 further includes a high transmission gear 730 and a low transmission gear 732 operatively connected to the input shaft 702.

The subtransmission 700 further includes an output shaft 740 configured for operative connection to the driveline 54 of the vehicle 20 (as shown by arrow 54 in FIGS. 4, 5 and 14). The output shaft 740 includes a high transmission gear 730' and a low transmission gear 732' operatively connected thereto. When the subtransmission 700 is in the high gear configuration (i.e. when the high transmission gear 730 drives the high transmission gear 730'), a first gear ratio is defined between the input shaft 702 and the output shaft 740. When the subtransmission 700 is in the low gear configuration (i.e. when the low transmission gear 732 drives the low transmission gear 732'), a second gear ratio is defined between the input shaft 702 and the output shaft 740. The first gear ratio (i.e. high gear ratio) is smaller than the second gear ratio (i.e. low gear ratio). The driver can thus select in which mode the subtransmission 700 is to be configured, i.e. between high gear ratio and low gear ratio, depending on the terrain on which the vehicle 20 travels, for example.

The output shaft 740 further has a bevel gear 750 defined in the rear portion thereof. The bevel gear 750 is adapted to operatively connect to a rear transaxle 751 of the vehicle 20 for driving the rear wheels 28 (as indicated by arrows 28 on FIG. 4). A front propeller shaft gear 752 is operatively connected to the output shaft 740, and is adapted to engage with a front propeller shaft gear 752' operatively connected to the front propeller shaft 60. As mentioned above, the front propeller shaft 60 selectively drives the front wheels 24 when the driver selects 4×4 operation of the vehicle 20.

Figure 15:
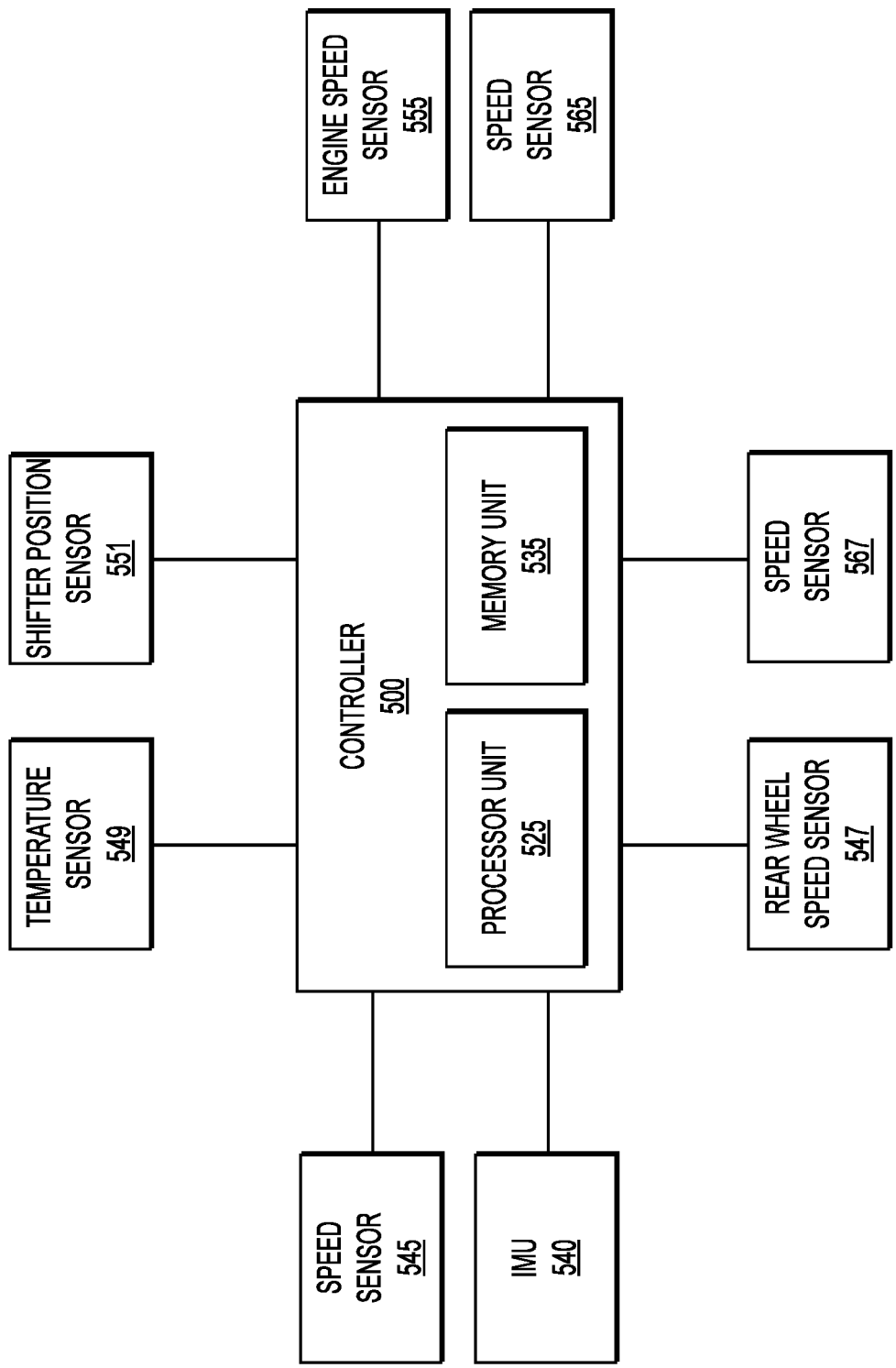
FIG. 15 is a block diagram of a controller configured to control the dual-clutch transmission.

Different methods for controlling the DCT 100 will now be described with reference to FIGS. 16 to 22. According to various embodiments, a controller 500 (illustrated schematically in FIG. 3) is in communication with the DCT 100 to control its operation. For example, the shifting of the gears of the DCT 100, including the gears 600, is controlled by the controller 500, notably by controlling the actuation of the first and second clutches 204a, 204b and by controlling actuation of a shifting drum (not shown). As shown in FIG. 15, the controller 500 has a processor unit 525 for carrying out executable code, and a non-transitory memory unit 535 that stores the executable code in a non-transitory medium (not shown) included in the memory unit 535. The processor unit 525 includes one or more processors for performing processing operations that implement functionality of the controller 500. The processor unit 525 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory unit 535 may be a semiconductor memory (e.g., read-only memory (ROM) and/or random-access memory (RAM)), a magnetic storage medium, an optical storage medium, and/or any other suitable type of memory. While the controller 500 is represented as being one control unit in this implementation, it is understood that the controller 500 could comprise separate control units for controlling components separately and that at least some of these control units could communicate with each other. Moreover, in some embodiments, the controller 500 could be in communication with an electronic control unit (ECU) of the vehicle 20.

During operation, the vehicle 20 may find itself in a "jump" whereby the wheels 24, 28 are off the ground such that the vehicle 20 is in the air. During such an event, it is desirable for the DCT 100 to be engaging the appropriate gear once the vehicle 20 lands back on the ground. Notably, if the vehicle 20 lands while engaging a gear that is not appropriate, the performance of the vehicle 20 may be negatively affected, namely as the full acceleration power of the vehicle 20 may not be available until the appropriate gear is engaged. In other words, landing with the appropriate gear engaged may ensure good driveability vehicle throughout a jump. In addition, landing the vehicle 20 without having the appropriate gear engage may cause unnecessary mechanical stresses on the DCT 100. Thus, with particular reference to FIG. 16, a method 800 for controlling the DCT 100 during a jump event will be described herein.

Figure 16:
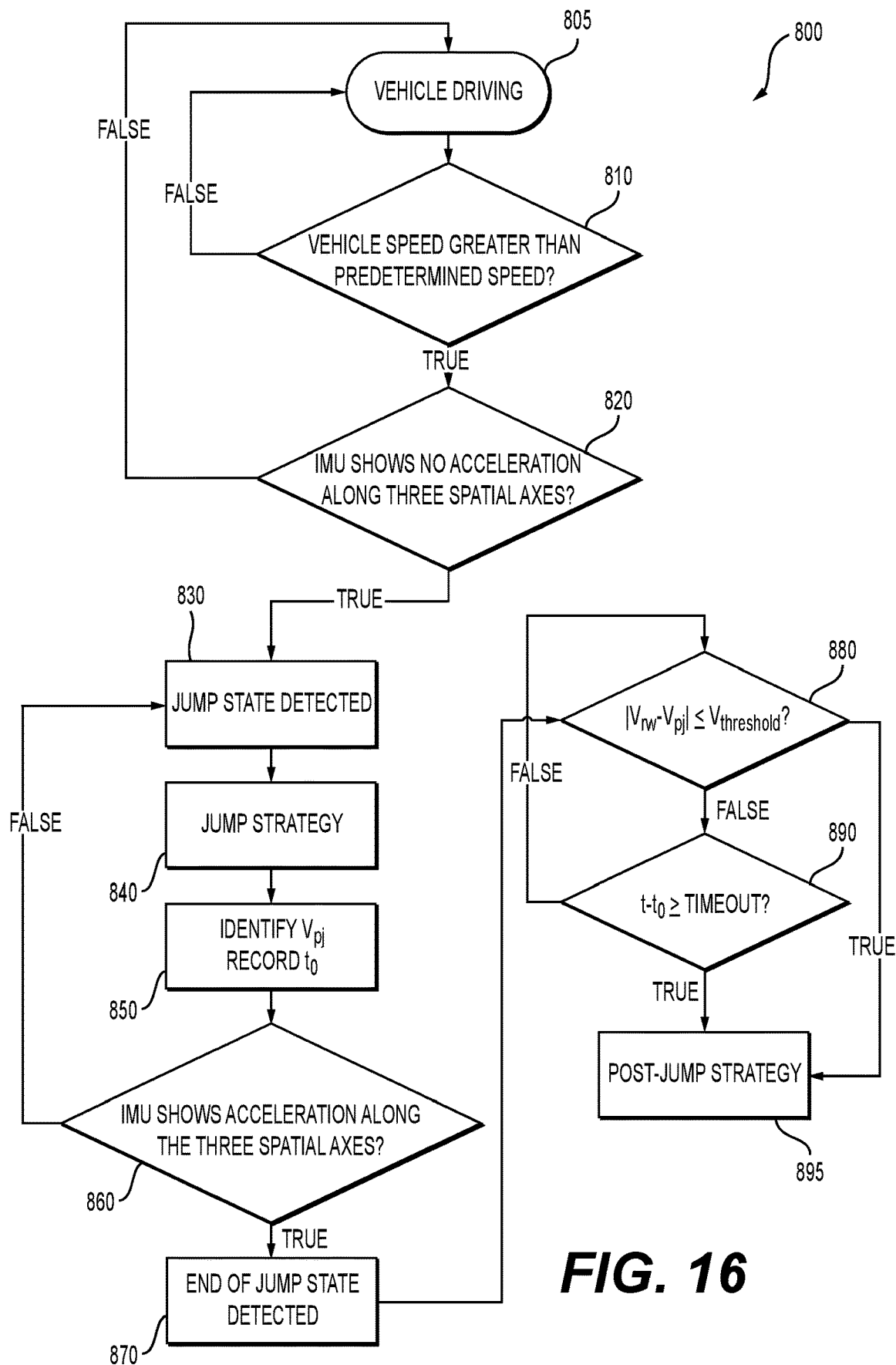
FIG. 16 is a flowchart representing a method for controlling the dual-clutch transmission during a jump according to an embodiment of the present technology.

At step 805, the method 800 begins with the vehicle 20 being driven during normal operation. That is, the gear shifting performed by the DCT 100 is not limited or restricted in any way that is different from its normal operation. According to the method 800, the controller 500 continuously executes steps during operation of the vehicle 20 in order to determine if the vehicle 20 has entered a "jump state" that is associated with the vehicle being off the ground surface (i.e., with the wheels 24, 28 being off the ground). Notably, in this embodiment, the jump state is defined at least in part by (i) an acceleration of the vehicle 20 along three spatial axes normal to one another (i.e., along XYZ spatial axes) and (ii) the speed of the vehicle 20. In particular, as shown in FIG. 16, at step 810, the controller 500 verifies if the speed of the vehicle 20 is greater than a predetermined speed. For example, the predetermined speed may be approximately 30 km/h. Any other suitable predetermined speed may be used instead. As shown in FIG. 15, in this embodiment, a speed sensor 545 senses the speed of the vehicle 20 and is in communication with the controller 150 to transmit electronic signals thereto that are indicative of the speed of the vehicle 20.

If, at step 810, the controller 500 validates that the vehicle 20 is driving at or below the predetermined speed, then the method 800 returns to step 805 (i.e., the jump state has not been detected and normal operation of the DCT 100 continues). Notably, when the vehicle 20 is driving at or below the predetermined speed, the vehicle 20 is unlikely to be able to jump or not for a long enough time to require special control of the DCT 100. If however, the controller 500 determines that the speed of the vehicle 20 is greater than the predetermined speed (and therefore the vehicle 20 may be able to jump), then the method 800 proceeds to step 820 whereby the controller 500 verifies the acceleration of the vehicle along the three spatial axes.

In this embodiment, in order to sense the acceleration of the vehicle 20 along the three spatial axes, the vehicle 20 has an inertial measurement unit (IMU) 540 (FIGS. 2 and 15) in communication with the controller 500. The IMU 540 includes one or more accelerometers. The IMU 540 senses the acceleration of the vehicle 20 along the three spatial axes and transmits electronic signals to the controller 500 indicative of the acceleration of the vehicle 20 along the three spatial axes.

Figure 17:
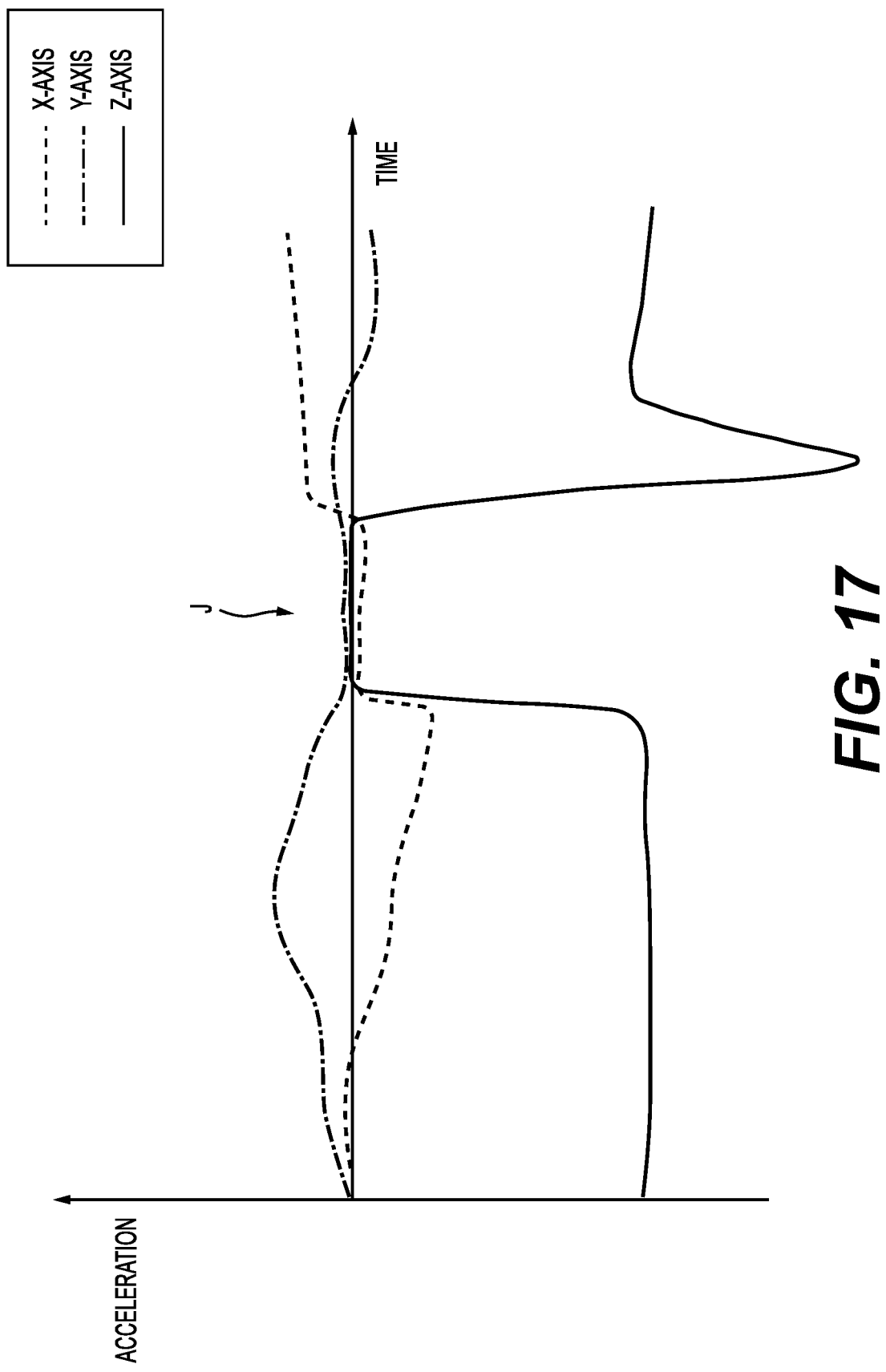
FIG. 17 is a graph representing an acceleration of the vehicle along three spatial axes during a jump.
Figure 18:
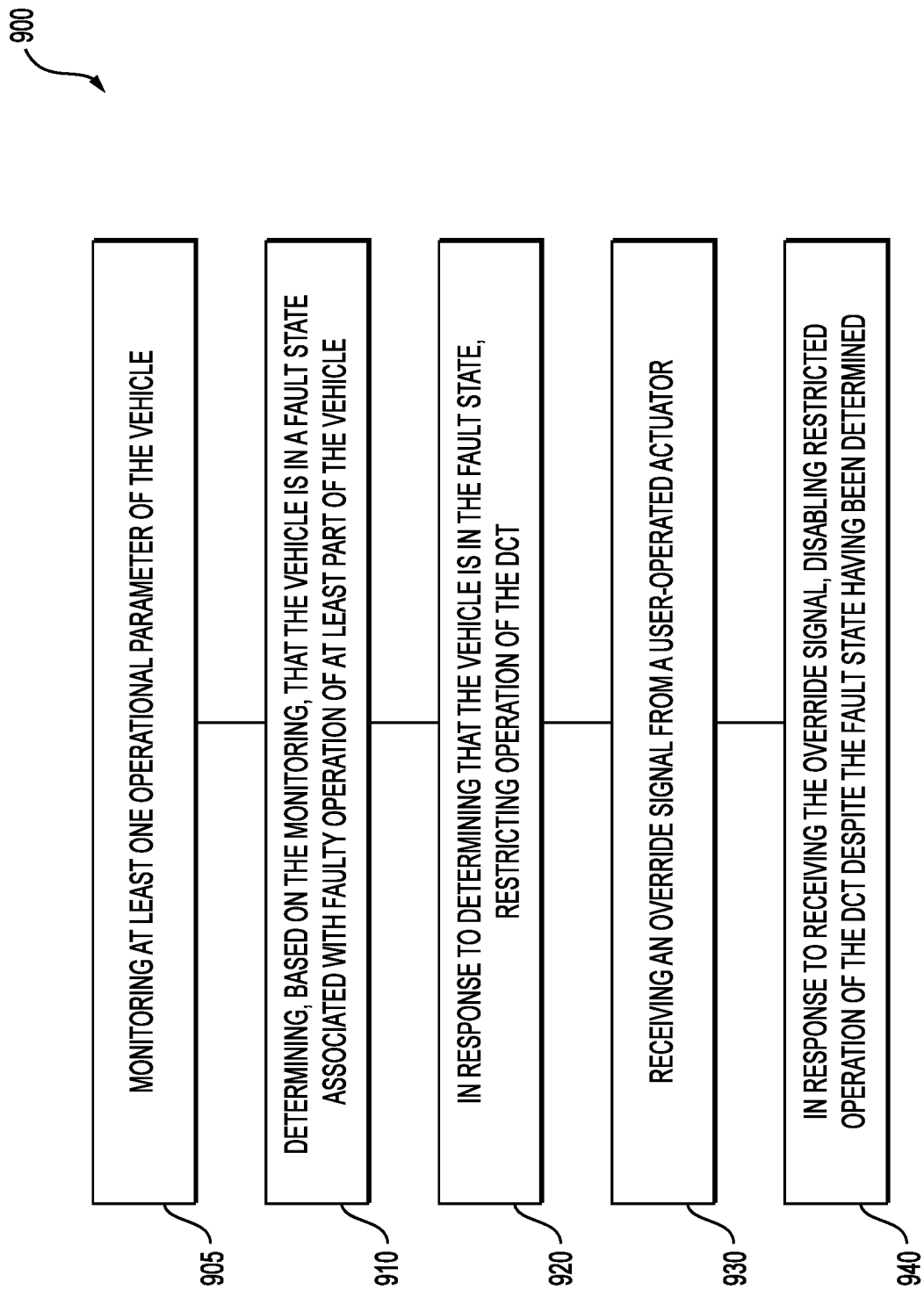
FIG. 18 is a flowchart representing a method for controlling the dual-clutch transmission during a fault state of the vehicle according to another embodiment of the present technology.

If at step 820, the controller 500 determines that the acceleration of the vehicle 20 along the three spatial axes is substantially null, the method 800 returns to step 805. More specifically, the controller 500 verifies if the sum of the absolute values of the acceleration of the vehicle 20 along the three spatial axes (i.e., |x|+|y|+|z|) is greater than a predetermined jump acceleration value, and if it is, the method 800 return to step 805. However, if the controller 500 determines that the acceleration of the vehicle 20 along the three spatial axes is less than or equal to the predetermined jump acceleration value, then the method proceeds to step 830 where the controller 500 determines that the vehicle 20 is in the jump state. In other words, the controller 500 determines that the vehicle 20 is in the jump state when the sum of the absolute values of the acceleration of the vehicle 10 along the three spatial axes is less than or equal to the predetermined jump acceleration value. Notably, as shown in FIG. 17 which illustrates an exemplary acceleration graph of the vehicle 20 along three spatial axes XYZ, when the vehicle 20 is off the ground entirely, the acceleration of the vehicle 20 along each of the three spatial axes reaches substantially zero. For example, the acceleration of the vehicle 20 is substantially zero along the Z-axis when the acceleration along the Z-axis is half or less than half of gravitational acceleration. Thus, a time interval J during which the acceleration of the vehicle 20 along each of the three spatial axes goes to substantially zero can be identified as the vehicle 20 being in the jump state. Therefore, as will be appreciated, the predetermined jump acceleration value is a value that is close to zero. For instance, in this embodiment, the predetermined jump acceleration value of the vehicle 20 is 5 m/s$^2$. The predetermined jump acceleration value may be any other suitable value in other embodiments (e.g., 4 or 6 m/s$^2$).

Returning to FIG. 16, once the controller 500 has determined that the vehicle 20 is in the jump state, then from step 830, at step 840, the controller 500 controls the DCT 100 according to a jump strategy. In particular, the jump strategy imposed by the controller 500 aims to limit the operation of the DCT 100. For instance, in this embodiment, the jump strategy according to which the controller 500 controls the DCT 100 prevents the shifting of the gear that is engaged by the DCT 100 at the moment that the vehicle 20 was determined to be in the jump state. For example, if the DCT 100 was engaging the fifth gear 605 at the moment the vehicle 20 was determined to be in the jump state, then the controller 500 prevents the DCT 100 from shifting out of the fifth gear 605. This jump strategy seeks to ensure good driveability of the vehicle 20 after the jump and to protect the mechanics of the DCT 100 as shifting out of the engaged gear of the DCT 100 could result in undue mechanical stresses being exerted on the DCT 100 once the vehicle 20 lands back on the ground.

At step 850, in this embodiment, the controller 500 identifies a vehicle pre-jump speed $V_{pj}$ corresponding to the speed of the vehicle 20 immediately prior to the vehicle having been determined to be in the jump state, and the controller 500 records an initial time reference point to at which the vehicle 20 had just been determined to have entered the jump state. Notably, as will be explained below, these two data points can be used to decide to change the control strategy of the DCT 100 from the jump strategy back to a less restrictive control strategy. In some embodiments, only one of the vehicle pre-jump speed $V_{pj}$ and the initial time reference point to may be recorded.

Next, at step 860, the controller 500 determines if the vehicle 20 has exited the jump state based at least on the acceleration of the vehicle 20 along at least one of the three spatial axes. More specifically, the controller 500 verifies if the IMU 540 senses an increase of the acceleration of the vehicle 20 along any one of the three spatial axes, or along more than one of the three spatial axes. If the IMU 540 does not sense any increase in the acceleration of the vehicle 20 along one or more of the three spatial axes, the method 800 returns to step 830. However, if the IMU 540 senses an increase of the acceleration of the vehicle 20 along one or more of the three spatial axes, the method 800 proceeds to step 870 where it is determined the vehicle 20 has exited the jump state.

In this embodiment, before proceeding to changing the control strategy for the DCT 100 back from the jump strategy in response to having determined that the vehicle has exited the jump state, the method 800 proceeds to validate that all of the wheels 24, 28 of the vehicle 20 have touched the ground surface. In particular, in this embodiment, the controller 500 uses the vehicle pre jump speed $V_{pj}$ (which corresponds to the speed of the vehicle 20 immediately prior to the vehicle 20 having been determined to be in the jump state) and a speed of one or both of the rear wheels 28 after the vehicle 20 has exited the jump state to determine if the rear wheels 28 have touched the ground surface. Notably, as the rear wheels 28 are expected to touch the ground surface after the front wheels 24 when the vehicle 20 lands back on the ground surface, the speed of the rear wheels 28 can be monitored to determine if the vehicle 20 has fully landed.

As shown in FIG. 15, in this embodiment, a rear wheel speed sensor 547 is in communication with the controller 500 to transmit thereto electronic signals indicative of the speed of one of the rear wheels 28.

Thus, at step 880, the controller 500 compares the rear wheel speed $V_{rw}$ with the vehicle pre jump speed $V_{pj}$. In particular, the controller 500 verifies if an absolute value of a difference between the rear wheel speed $V_{rw}$ and the vehicle pre jump speed $V_{pj}$ is equal to or less than a predetermined threshold speed difference. In other words, the controller 500 verifies if the rear wheel speed $V_{rw}$ is sufficiently close to the vehicle pre-jump speed $V_{pj}$. If the absolute value of the difference between the rear wheel speed $V_{rw}$ and the vehicle pre-jump speed $V_{pj}$ is equal to or less than the predetermined threshold speed difference, it is determined that the rear wheels 28 have touched the ground surface and the method 800 thus proceeds to step 895 where the controller 500 controls the DCT 100 according to a post-jump strategy. However, in response to the difference between the rear wheel speed $V_{rw}$ and the vehicle pre-jump speed $V_{pj}$ being greater than the predetermined threshold speed difference (i.e., determining, based on the rear wheel speed $V_{rw}$ and the vehicle pre jump speed $V_{pj}$, that the rear wheels 28 have not touched the ground surface), in this embodiment, the method 800 proceeds to an alternate manner in which to determine that the rear wheels 28 have touched the ground surface. More specifically, the method 800 proceeds to step 890 where the controller 500 determines a time elapsed since the initial time reference point $t_0$ at which the vehicle 20 had just been determined to have entered the jump state. If the time elapsed since the initial time reference point $t_0$ is less than a predetermined timeout, not enough time has passed to safely assume that the vehicle has landed and the method 800 thus returns to step 880. However, if the time elapsed since the initial time reference point $t_0$ is equal to or greater than the predetermined timeout, the controller 500 determines that the vehicle 20 has landed and the method 800 therefore proceeds to step 895 whereby the controller 500 controls the DCT 100 according to the post-jump strategy. In this embodiment, the predetermined timeout is less than 1 second (e.g., 0.5 seconds). Other values of the predetermined timeout are also contemplated.

It is contemplated that, in alternative embodiments, the initial time reference point $t_0$ could be recorded after step 870, namely at a point at which the vehicle 20 had just exited the jump state.

The post-jump strategy is different from the jump strategy. Particularly, the post-jump strategy seeks to be less restrictive of the operation of the DCT 100 than the jump strategy. For instance, in this embodiment, the post-jump strategy comprises allowing shifting of the engaged gear of the DCT 100. Notably, in this embodiment, the post-jump strategy corresponds to the normal control strategy under which the DCT 100 is controlled.

It is contemplated that, in some embodiments, one of the step 880 and the step 890 could be omitted such that the method 800 relies on a single one of the steps 880, 890 to determine if the vehicle 20 has fully landed on the ground surface. Moreover, in some embodiments, the method 800 may omit both the steps 880, 890 such that the method 800 does not verify if the vehicle 20 has fully landed on the ground surface. For instance, the method 800 may instead proceed directly to step 895 after determining that the vehicle has exited the jump state (step 870).

As will be appreciated, by controlling the DCT 100 according to the method 800, the mechanics of the DCT 100 can be more protected from stresses caused by a jump to which the vehicle 20 is subjected. Notably, if the method 800 were not executed and instead the normal control strategy was implemented to control the DCT 100 when the vehicle 20 undergoes a jump, the vehicle 20 could land while the DCT 100 is engaging a gear that is not suitable for the speed of the vehicle 20 when the vehicle 20 lands. Furthermore, by basing the detection of the jump state of the vehicle 20 on the acceleration of the vehicle 20 along the three spatial axes instead of, for example, the acceleration of the wheels 24, 28, a more accurate detection of the jump state can be achieved. In particular, the acceleration of the vehicle 20 along the three spatial axes as measured by the IMU 540 is not subject to the significant interference which the acceleration of the wheels 24, 28 undergoes when the vehicle 20 is driven in off-road environments.

In some rare cases, the vehicle 20 could undergo faulty operation if, for example, a component of the vehicle 20 fails during operation. In this embodiment, if such faulty operation occurs, the controller 500 which controls the DCT 100 restricts operation of the DCT 100 to prevent mechanical damage thereto. However, as off-road vehicles such as the vehicle 20 are used in off-road environments that can present unique challenges that may not be present for a road vehicle, it may be preferable to defer to the judgement of the driver of the vehicle 20 rather than imposing automatically restrictions on the operation of the DCT 100. To that end, a method 900 for controlling the DCT 100 according to an aspect of the present technology will be described herein with reference to FIG. 18.

The method 900 begins at step 905 with the monitoring of one or more operational parameters of the vehicle 20. The operational parameters may vary according to various embodiments. For instance, in this embodiment, the monitored operational parameters of the vehicle 20 include a temperature of the DCT 100, the speed of the vehicle (as measured by speed sensor 545 shown in FIG. 15), and a position of the gear shifter 56 (FIG. 2) of the DCT 100. For example, the monitored temperature of the DCT 100 can be a temperature of one or both of the clutches 204a, 204b and/or the temperature of the transmission fluid contained within the DCT 100. Notably, in this embodiment, as shown in FIG. 15, a temperature sensor 549 for sensing the temperature of the first clutch 204a (which is expected to undergo heavier use than the second clutch 204b as it drives the first gear 601) is in communication with the controller 500 to transmit electronic signals thereto indicative of the temperature of the first clutch 204a. Similarly, another temperature sensor could be in communication with the controller 500 to transmit thereto electronic signals indicative of the temperature of the transmission fluid. In addition, a shifter position sensor 551 is in communication with the controller 500 to transmit electronic signals thereto representative of the position of the gear shifter 56.

Next, at step 910, the controller 500 determines, based on the monitoring of the operational parameters of the vehicle 20, that the vehicle 20 is in a fault state associated with faulty operation of at least part of the vehicle 20. The fault state may be determined in different ways. In some instances, this may include determining that one of the sensors 545, 549, 551 is malfunctioning. Notably, when the sensors 545, 549, 551 malfunction, the controller 500 may not receive any input signals from one or more of the sensors 545, 549, 551 such that the value of the monitored operational parameter cannot be ascertained by the controller 500. For example, the controller 500 may not receive the speed of the vehicle if the speed sensor 545 is malfunctioning. In other instances, determining the fault state may include determining that a sensed value of one or more of the monitored operational parameters is outside of an acceptable or expected range of values thereof. For example, if the temperature of the clutches 204a, 204b is expected to be within a range defined by a maximum temperature threshold, the sensing of a temperature greater than the maximum temperature threshold results in determining that the vehicle 20 is in the fault state. In some cases, the malfunction of one of the sensors 545, 549, 551 could result in the controller 500 receiving sensed values of a monitored operational parameter that is outside of an expected range of values.

Once it has been determined that the vehicle 20 is in the fault state, the method 900 proceeds to step 920 where the controller 500 restricts operation of the DCT 100. Notably, in order to protect the vehicle 20 and/or the DCT 100, the controller 500 prevents one or more operations being executed by the DCT 100. More specifically, in this embodiment, the controller 500 prevents a gear shift of the DCT 100. That is, the controller 500 does not allow the DCT 100 from engaging a different gear than the one already engaged when the fault state of the vehicle 20 was detected. For example, this may include preventing the DCT 100 from engaging a different one of the gears 600 and/or the parking lock gear 720 if the DCT 100 was not previously engaging that particular gear. The controller 500 could restrict operation of the DCT 100 in other additional or alternative ways in other embodiments. For instance, in some embodiments, the controller 500 restricts operation of the DCT 100 by disengaging the clutches 204a, 204b (i.e., the clutches 204a, 204b cannot be actuated). In some embodiments, the controller 500 restricts operation of the DCT 100 by disabling engagement of selected gears of the DCT 100. For example, the controller 500 could prevent the DCT 100 from engaging one or more particular gears (e.g., the gears 603, 604, 605, 606 and 607).

At the same time as the controller 500 restricts operation of the DCT 100, a fault signal is displayed on a dashboard of the vehicle 20 to provide an indication to the driver of the fault state of the vehicle 20. For example, a dedicated light may illuminate on the dashboard to relay the fault signal to the driver.

At this point, the controller 500 thus partially or completely restricts operation of the DCT 100 in order to safeguard the DCT 100 and/or the vehicle 20. However, it is possible that, given other circumstances (e.g., based on where the vehicle is located), the driver may want to willingly forego such safeguarding and operate the vehicle 20 irrespective of the fault state in order to get out of a particular situation. For example, the driver may favor getting out of a treacherous environment and/or situation rather than ensure the integrity of the mechanics of the vehicle 20. Therefore, according to this embodiment of the present technology, the vehicle 20 is provided with an override button 925 (schematically illustrated in FIG. 2) disposed on or around a dashboard of the vehicle 20 that is usable by the driver to override the restricted operation of the DCT 100. The override button 925 may not necessarily be a button in other embodiments and could instead be replaced with any other suitable user-operated actuator. The controller 500 is in communication with the override button 925 to receive an override signal therefrom when the override button 925 is actuated by the driver.

Thus, when the driver judges that the situation calls for undoing the restricted operation of the DCT 100, the driver presses the override button 925, alone or in combination with another user-operated actuator, which causes the override button 925 to generate an override signal that is transmitted to and received by the controller 500 at step 930. Once the controller 500 receives the override signal, at step 940, the controller 500 disables the restricted operation of the DCT 100 despite the fault state having been determined. The controller 500 also records the fault (e.g., absent sensor signal) and the fact that the override button 925 was pressed to override the fault state. The partial or full functionality of the DCT 100 is thus restored, thereby ignoring the fault state. For example, if the DCT 100 is restricted from engaging the parking lock gear 720 due to a malfunctioning speed sensor 545 such that the driver's pressing of a parking button (not shown) does not result in engaging the parking lock gear 720, the driver could press the override button 925, a brake pedal and the parking button to force the parking lock gear 720 to be engaged. As another example, if the DCT 100 is restricted from actuating the clutches 204a, 204b because the temperature of the clutch 204a is too high thereby preventing the vehicle 20 from moving, the driver could press the override button 925 to allow the driver to restore actuation of the clutches 204a, 204b to move the vehicle 20. As yet another example, if operation of the DCT 100 is restricted due to a malfunctioning gear shifter 56 thereby preventing the driver from engaging the transmission gear 608 (corresponding to the reverse gear of the DCT 100), the driver could press the override button 925 and the downshift paddle 65 (FIG. 1) to allow the driver to restore operation of the DCT 100 and engage the transmission gear 608 so as to drive in reverse.

As will be appreciated, in many situations, the implementation of the override button 925 may allow the driver to drive the vehicle 20 to a safe location where the cause of the fault state can be addressed. This may be useful for example if the fault state is detected when the vehicle 20 is in an inhospitable environment without any help available nearby.

As previously mentioned, the vehicle 20 has upshift and downshift gear paddles 55, 65 for allowing the driver to manually upshift and downshift the gears 600 of the DCT 100 in a semi-automatic mode rather than letting the controller 500 doing it automatically in an automatic mode. While it is conventionally known in road vehicles to provide a "tip-in" functionality which allows the vehicle to exit the semi-automatic mode and "tip-in" to the automatic mode when a driving situation changes, such functionality may not be suitable for off-road vehicles because driving situations tend to change very rapidly when operating an off-road vehicle in an off-road environment. Thus, with reference to FIG. 19, according to an embodiment of the present technology, a method 1000 for controlling the DCT 100 is provided which allows the controller 500 a different manner in which to determine if the DCT 100, once in the semi-automatic mode, should return back to be operated in the automatic mode. The graph of FIG. 20 provides an example of the engine speed of the vehicle 20 during the execution of the method 1000 and also shows the gear shifting pattern during the execution of the method 1000.

Figure 19:
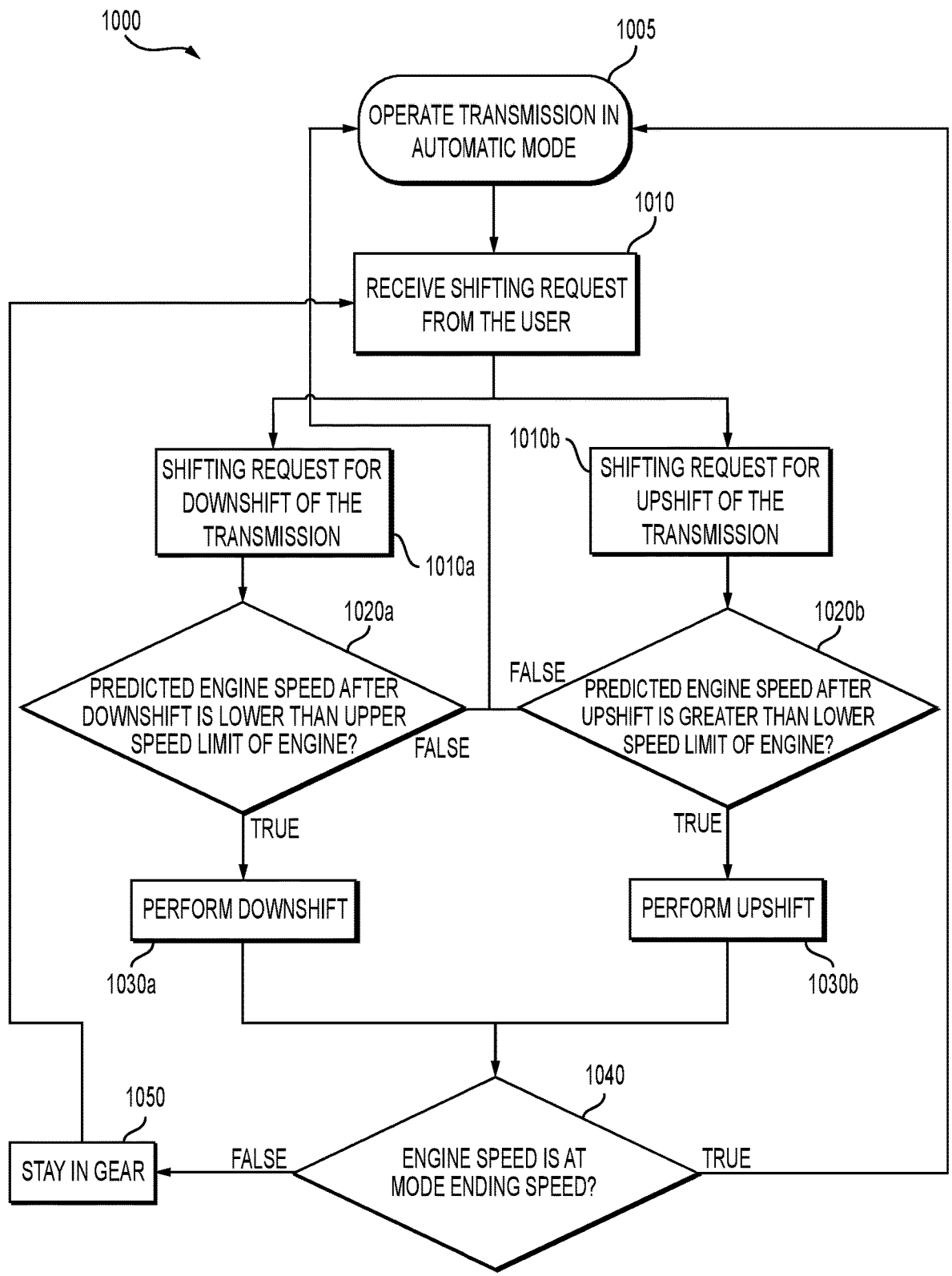
FIG. 19 is a flowchart representing a method for controlling the dual-clutch transmission during a semi-automatic mode of operation of the dual-clutch transmission according to another embodiment of the present technology.
Figure 20:
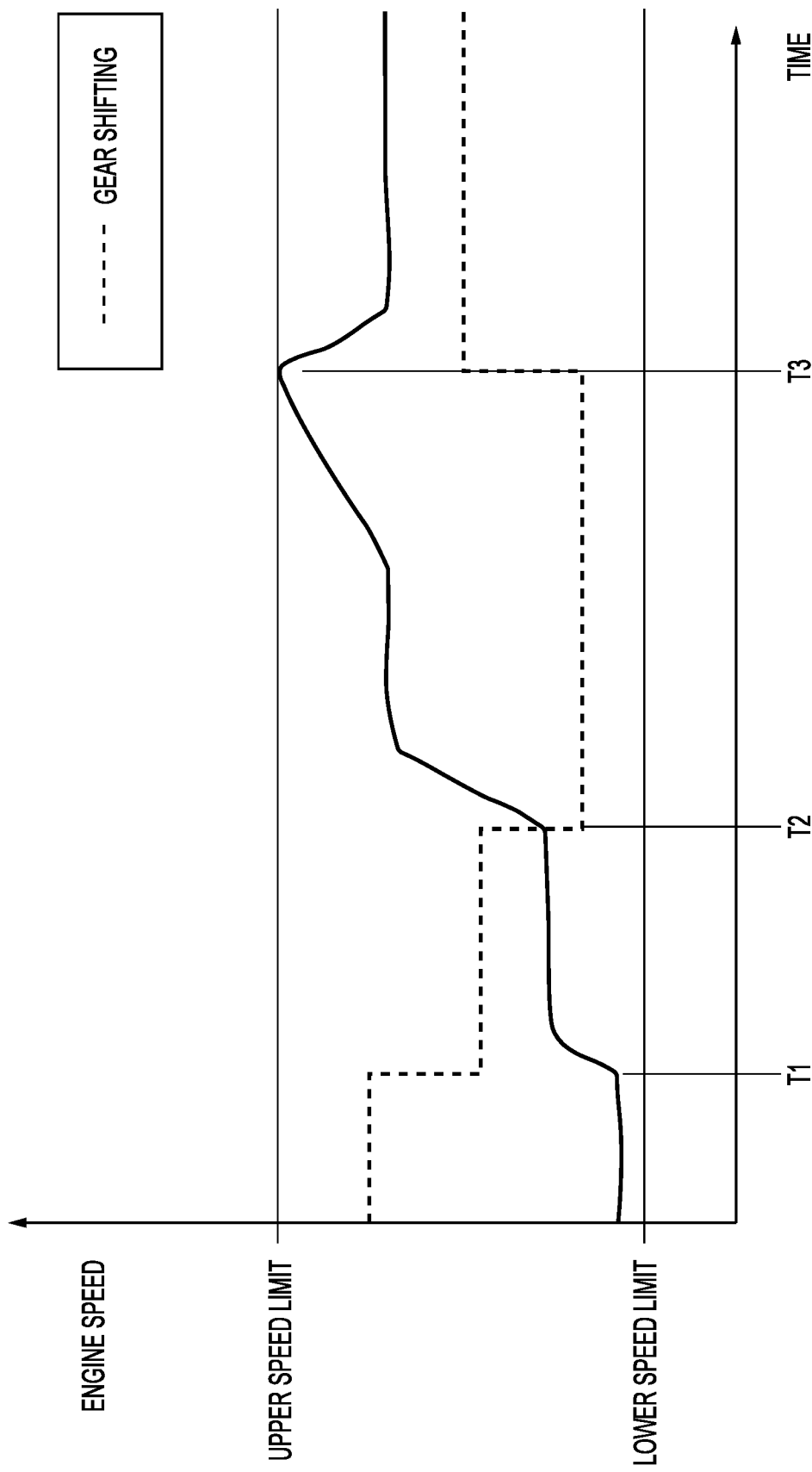
FIG. 20 is a graph representing an engine speed of the vehicle during execution of the method of FIG. 19.

As shown in FIG. 19, the method 1000 begins at step 1005 with the DCT 100 being operated in the automatic mode. In the automatic mode, the controller 500 determines on its own when to engage different ones of the gears 600, notably automatically performing the gear shifting of the DCT 100 based on the speed of the vehicle 20. In other words, the gear shifting between the gears 600 is not based on shifting requests from the driver.

The driver then wishing to control the shifting of the gears 600 of the DCT 100 actuates ones of the upshift paddle 55 and the downshift paddle 65. As such, at step 1010, the controller 500 receives a shifting request from the upshift paddle 55 or the downshift paddle 65. At step 1010a, the shifting request is received from the downshift paddle 65 requesting a downshift of the DCT 100 from a current gear (i.e., a gear currently engaged by the DCT 100) to a lower gear. Alternatively, at step 1010b, the shifting request is received from the upshift paddle 55 requesting an upshift of the DCT 100 from the current gear to a higher gear.

If the shifting request is a downshift request, the method 1000 proceeds from step 1010a to step 1020a where, before performing the requested downshift and thereby operating the DCT 100 in the semi-automatic mode, the controller 500 calculates a predicted speed of the engine 52 of the vehicle 20 if the shifting request were to be fulfilled. The controller 500 then verifies if the predicted speed of the engine 52 would be below an upper speed limit of the engine 52. In this embodiment, the upper speed limit is less than but close to (i.e., within 5% of) a redline speed of the engine 52. It is to be understood that the "redline speed" of the engine 52 refers to the maximum engine speed at which the engine 52 and its components are designed to operate without causing damage to the components or other parts of the engine 52. It is contemplated that, in other embodiments, the upper speed limit of the engine 52 could correspond to the redline speed of the engine 52. The upper speed limit may be calibrated relative to the redline speed such as to be offset therefrom by a given percentage (e.g., 5%). If the predicted speed of the engine 52 is higher than the upper speed limit of the engine 52, the controller 500 does not perform the requested downshift and the method 1000 returns to step 1005 where the DCT 100 keeps operating in automatic mode.

If the shifting request is an upshift request, the method 1000 instead proceeds from step 1010b to step 1020b where, before performing the requested upshift and thereby operating the DCT 100 in the semi-automatic mode, the controller 500 calculates a predicted speed of the engine 52 of the vehicle 20 if the shifting request were to be fulfilled. The controller 500 then verifies if the predicted speed of the engine 52 would be higher than a lower speed limit of the engine 52. The lower speed limit is greater than an idle speed of the engine 52. More specifically, the lower speed limit has a value adequate to prevent the engine 52 from stalling. As such, the lower speed limit may be significantly higher than the idle speed of the engine 52. For instance, in this embodiment, the lower speed limit is 60% greater than the idle speed of the engine 52. In another embodiment, the lower speed limit may be approximately 1000 rpm greater than the idle speed of the engine 52. It is to be understood that the "idle speed" of the engine 52 refers to the rotational speed the engine 52 runs at when the engine 52 is idling. If the predicted speed of the engine 52 is lower than the lower speed limit of the engine 52, the controller 500 does not perform the requested upshift and the method 1000 returns to step 1005 where the DCT 100 keeps operating in automatic mode.

If at steps 1020a, 1020b, the predicted speed of the engine 52 is lower than the upper speed limit of the engine 52 (step 1020a) or higher than the lower speed limit of the engine 52 (step 1020b), then the controller 500 begins operating the transmission in the semi-automatic mode and, at steps 1030a, 1030b, the controller 500 performs the requested downshift or upshift of the DCT 100 respectively.

The method 1000 then proceeds to validate that the speed of the engine 52 is still adequate to continue operating in the semi-automatic mode. To that end, the controller 500 monitors the rotational speed of the engine 52 via an engine speed sensor 555 (FIG. 15) that is in communication with the controller 500 to transmit electronic signals thereto representative of the speed of the engine 52. At step 1040, the controller 500 verifies if the speed of the engine 52 is at a mode ending speed that indicates that the engine 52 should return to being operated in the automatic mode. In particular, in this embodiment, the mode ending speed has two values, namely the lower speed limit of the engine 52 and the upper speed limit of the engine 52. In other words, if the speed of the engine 52 is not at the upper or lower speed limits of the engine 52, then the method 1000 proceeds to step 1050 where the controller 500 controls the DCT 100 to stay in the currently engaged gear. Semi-automatic operation of the DCT 100 thus resumes by returning to step 1010 with the semi-automatic mode already engaged. However, in response to the speed of the engine 52 being at the mode ending speed, namely at the upper speed limit or at the lower speed limit of the engine 52, the method 1000 returns to step 1005 such that the controller 500 returns operation of the DCT 100 in the automatic mode and the DCT 100 is upshifted or downshifted to engage a suitable gear which will result in the speed of the engine 52 not being at the upper speed limit or the lower speed limit of the engine 52. The mode ending speed may have different values in other embodiments (e.g., within a given percentage of the upper and lower speed limits of the engine 52).

As will be appreciated from the above, the tip-in functionality provided by the method 1000 allows the autonomous transition to the automatic mode of operation of the DCT 100 based on the speed of the engine 52. This may be helpful for example if the driver forgets that the DCT 100 is in the semi-automatic mode and therefore foregoes using the upshift and downshift paddles 55, 65 while in the semi-automatic mode. Notably, according to an example, as shown in the graph of FIG. 20, at times t1 and t2, the driver downshifts the DCT 100 but, between times t2 and t3, forgets to use the upshift and downshift paddles 55, 65 such that, at time t3, the speed of the engine 52 reaches the upper speed limit of the engine 52 which triggers the controller 500 to return operation of DCT 100 to the automatic mode in order to upshift the DCT 100 and thereby reduce the rotational speed of the engine 52.

Controlling the DCT 100 involves pressurizing the transmission fluid routed to either of the first and second clutches 204a, 204b when actuating the first and second clutches 204a, 204b. To do this accurately, it is preferable to know a relationship between the hydraulic pressure of the transmission fluid supplied to the clutches 204a, 204b and the torque that the clutches 204a, 204b can transmit. Notably, this relationship characterizes the amount of hydraulic pressure that is necessitated to begin transmitting the torque received from the engine 52. Conventionally, DCTs in road vehicles have their clutches controlled in what is known as a "microslip" condition in which the transmission fluid pressure routed to the clutches is sufficient only for the clutches not to slip. However, this may not be adequate for off-road vehicles which are subjected to many bumps, jumps and throttle kicks during operation which could cause a significant drop in the torque transmitted by the clutches. A method 1100, illustrated in FIG. 21, is thus provided according to an embodiment of the present technology for controlling the DCT 100 such as to accurately gauge a pressure-torque function of each of the clutches 204a, 204b and using that information to allow for more accurate clutch control.

Figure 21:
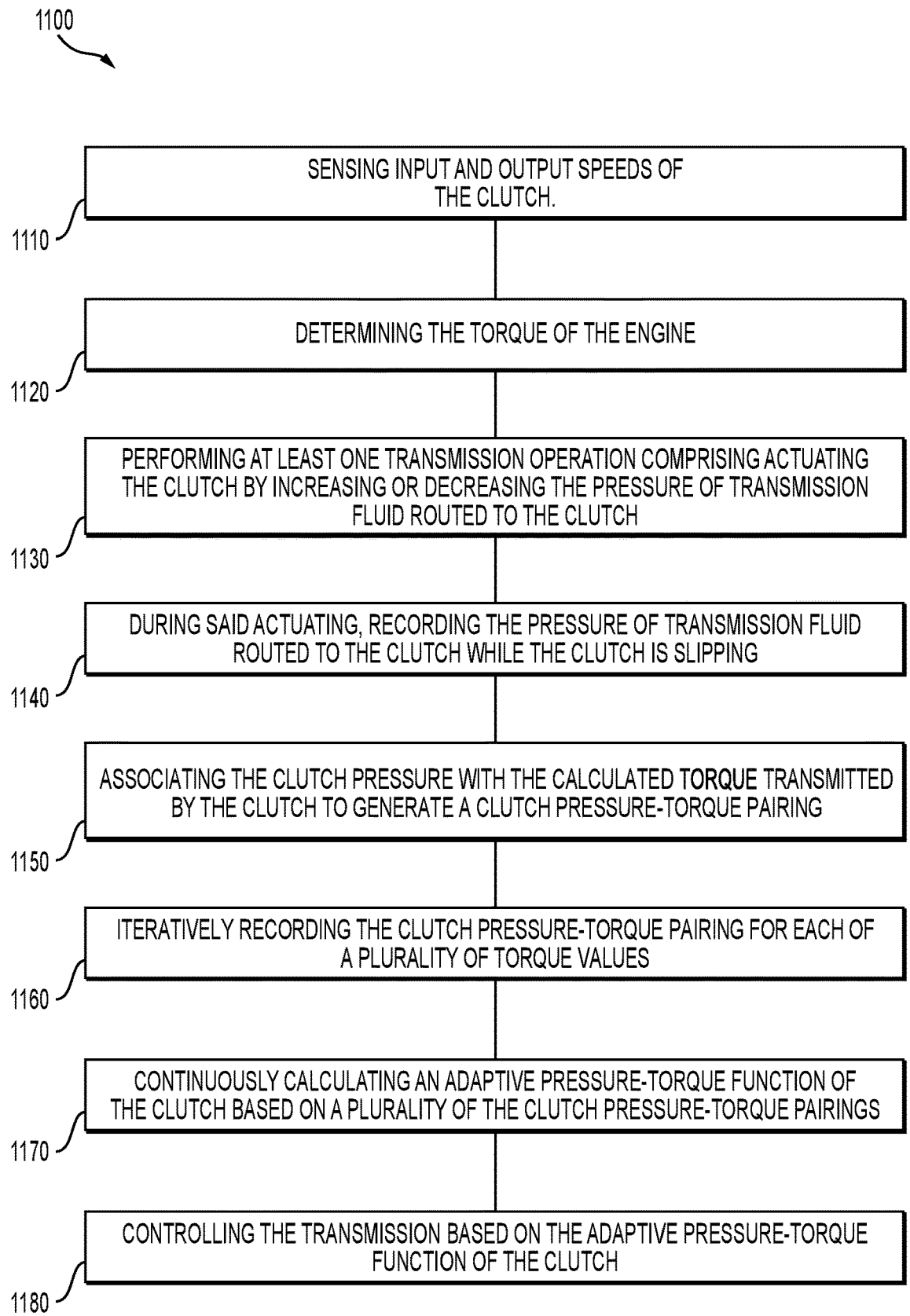
FIG. 21 is a flowchart representing a method for controlling the dual-clutch transmission based on an adaptive pressure-torque function according to another embodiment of the present technology.

As shown in FIG. 21, the method 1100 begins at step 1110 by determining an input speed and an output speed of the dual-clutch 202. Notably, in this embodiment, the input speed of the dual-clutch 202, which corresponds to the rotation speed of the central clutch gear 200, is determined based on the speed of the engine 52, while the output speed of the dual-clutch 202 is determined based on the speeds sensed by two speed sensors 565, 567 (FIG. 15). In this embodiment, the speed sensors 565, 567 are disposed within the housing 102 of the DCT 100 and connected thereto at positions adjacent to the gears 601', 607' respectively in order to sense their respective speeds. The output speed of the dual-clutch 202 is determined based on the speeds of the gears 601', 607' as sensed by the speed sensors 565, 567. Notably, in this embodiment, the output speed of the dual-clutch 202 corresponds to the output speed of the first clutch 204a and the output speed of the second clutch 204a (i.e., the outputs speeds of the clutches 204a, 204b are recorded). It is contemplated that a single speed sensor could be used to determine the output speed of the dual-clutch 202 in other embodiments. The speed sensors 565, 567 are in communication with the controller 500 to transmit thereto respective electronical signals indicative of the speeds of the gears 601', 607'.

At step 1120, a torque of the engine 52 is determined by the controller 500. That is, the controller 500 determines the torque produced by the crankshaft 53. For instance, the torque of the engine 52 may be calculated based in part on the speed of the engine 52.

At step 1130, a transmission operation is performed by the DCT 100 which involves actuating the first clutch 204a or the second clutch 204b by increasing or decreasing a pressure of transmission fluid routed thereto. More specifically, taking the first clutch 204a as an example, the pressure of transmission fluid routed to the chamber 350a is increased to cause the pressure plate 320a to squeeze the corresponding clutch disks 250 with the clutch plates 242 together thereby causing their engagement with one another. Conversely, when a torque handover to the second clutch 204b is occurring, the pressure of transmission fluid routed to the chamber 350a is decreased to cause the pressure plate 320a to cease squeezing the corresponding clutch disks 250 with the clutch plates 242 together. The same sequences occur when actuating the second clutch 204b. It should be understood that when the first clutch 204a is moved to an engaged position in which the pressure plate 320a squeezes the corresponding clutch disks 250 with the clutch plates 242 together, the second clutch 204b is moved to a disengaged position in which the pressure plate 320b does not squeeze the corresponding clutch disks 250 with the clutch plates 242.

The transmission operation effected at step 1130 could include shifting the DCT 100 from a current gear (i.e., a currently engaged one of the gears 600) to one of a higher gear and a lower gear. Notably, during upshifting and downshifting of the DCT 100, the first and second clutches 204a, 204b are actuated, whereby one of the clutches 204a, 204b has the pressure of transmission fluid routed thereto increased in order to drive one of the shafts 400a, 400b. The transmission operation effected at step 1130 could also include launching the vehicle 20 from a stand-still state. The stand-still state refers to the vehicle 20 being immobile while in operation. In particular, when the vehicle 20 begins moving from the stand-still state, the first clutch 204a will be actuated to transmit the torque from the engine 52 to the shaft 400a and thereby to the first gear 601. It is contemplated that, in some embodiments, both clutches 400a, 400b could be actuated simultaneously for a short time when launching the vehicle 20 from the stand-still state in order to transmit more torque during launch. Notably, both the first gear 601 and the second gear 602 could be engaged for a short time while both clutches 400a, 400b are still slipping.

The remainder of the method 1100 will be described in respect of the first clutch 204a being actuated. It should be understood that the same method is performed when the second clutch 204b is actuated. Moreover, in other embodiments in which the transmission 100 is not a dual-clutch transmission and comprises a single clutch, it should be understood that the method 1100 is performed in respect of that single clutch.

During the actuation of the first clutch 204a performed at the step 1130, the controller 500 also performs step 1140 in which the controller 500 records the pressure of transmission fluid routed to the clutch 204a (i.e., "clutch pressure") continuously while the clutch 204a slips (i.e., when the input and output speeds of the clutch 204a do not match). More specifically, the controller 500 determines that the clutch 204a is slipping when the absolute value of a difference between the input and output speed of the clutch 204a is greater than a predetermined value. The controller 500 may record the clutch pressure of the clutch 204a approximately every 10 ms as long as the clutch 204a remains slipping. During slipping of the clutch 204a, the torque produced by the clutch 204a is less than the torque produced by the engine 52.

It is contemplated that, in other embodiments, the controller 500 records the clutch pressures of the clutch 204a at an initial torque transmitting point. The initial torque transmitting point corresponds to the point at which the pressure plate 320a squeezes the clutch disks 250 with the clutch plates 242 with sufficient pressure for the clutch 204a to begin exerting the torque transmitted thereto by the engine 52. In other words, at the initial torque transmitting point, the torque produced by the clutch 204a is equal to the torque produced by the engine 52. The initial torque transmitting point is defined and can be identified by the input speed of the clutch 204a being substantially equal to the output speed of the clutch 204a (and therefore the input and output speed of the dual-clutch 202 being substantially equal when the clutch 204a is actuated). In this context, the input speed of the clutch 204a being "substantially equal" to the output speed of the clutch 204a refers to the input speed of the clutch 204a being within 50 rpm of the value of the output speed of the clutch 204a.

Next, at step 1150, the controller 500 associates the clutch pressure while the clutch 204a slips with the calculated torque transmitted by the clutch 204a at that moment. The torque transmitted by the clutch 204a can be calculated based on the engine torque and the time derivative of the speed of the input shaft, as known by a person skilled in the art. By this association, the controller 500 generates a clutch pressure-torque pairing PT (see FIG. 22) which is a data point consisting of the pressure of the transmission fluid routed to the clutch 204a and the torque transmitted by the clutch 204a at that moment. This process is repeated as long as the clutch 204a remains in slip mode.

Figure 22:
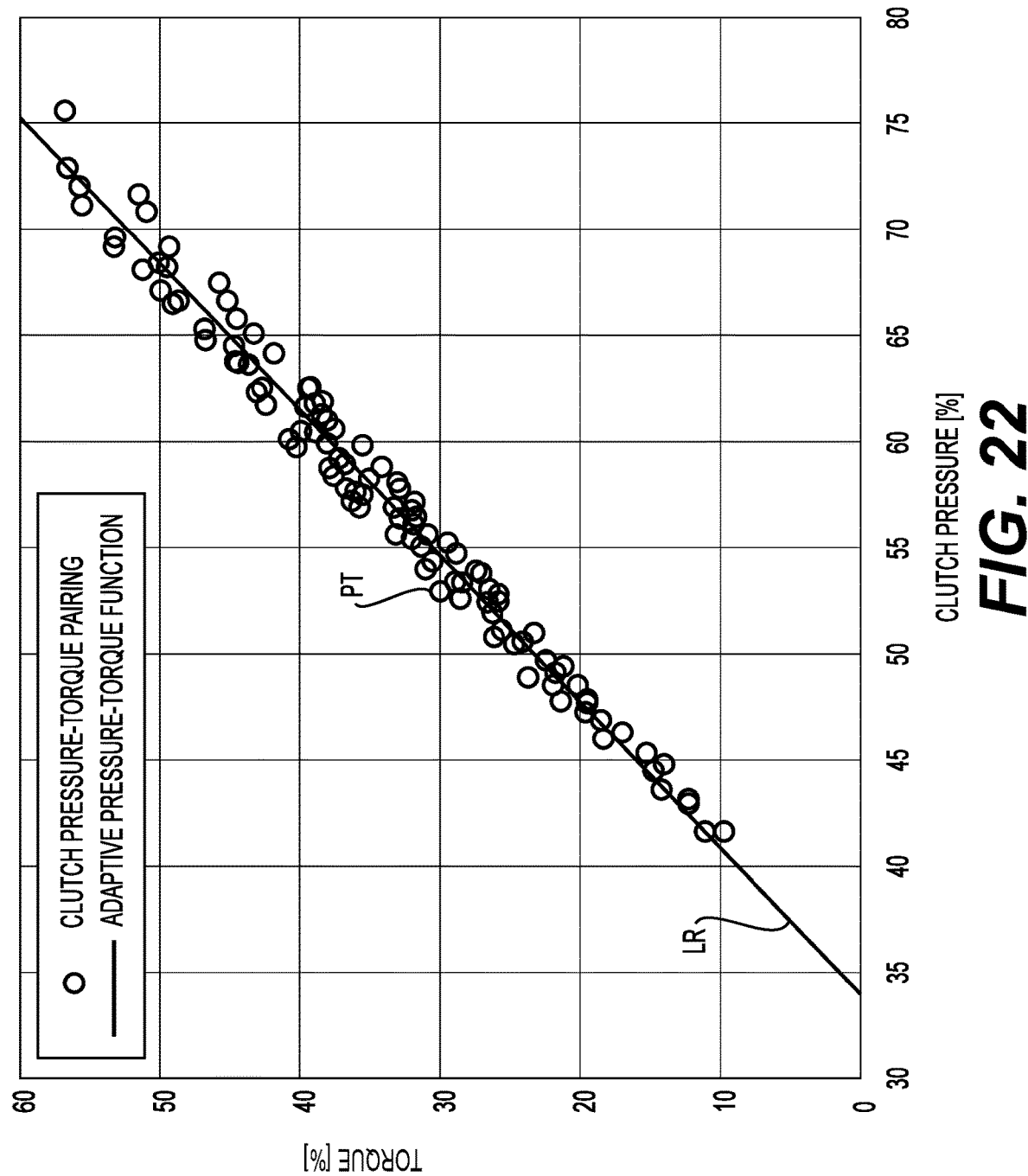
FIG. 22 is a graph representing an adaptive pressure-torque function calculated by the method of FIG. 21.

At step 1160, the controller 500 iteratively records the clutch pressure-torque pairing PT for each of a plurality of torque values. That is, during operation of the vehicle 20, when the DCT 100 is being upshifted or downshifted and when the vehicle 20 is being launched from the stand-still state, the controller 500 records the clutch pressure-torque pairings PT at various torque values thereby obtaining a mapping of the clutch pressure-torque pairings PT as illustrated in FIG. 22.

At step 1170, the controller 500 continuously calculates an adaptive pressure-torque function of the clutch 204a based on the clutch pressure-torque pairings PT. The pressure-torque function of the clutch 204a is proportional to the amount of friction necessitated between the clutch disks 250 and the clutch plates 242 for the clutch 204a to begin transmitting the torque received from the engine 52. In this case, the pressure-torque function is said to be "adaptive" in that it is continuously recalculated during operation of the DCT 100 as it is expected to change during operation of the clutch 204a (e.g., due to varying transmission fluid temperature) and during a lifetime of the clutch 204a (e.g., due to wear). With reference now to FIG. 22, in this embodiment, the adaptive pressure-torque function is calculated by determining a linear regression LR that corresponds to the clutch pressure-torque pairings PT that are mapped by the controller 500. The linear regression LR takes into account the various clutch pressure-torque pairings PT that were iteratively recorded during operation of the DCT 100 and provides a linear function that best fits the distribution of clutch pressure-torque pairings PT. It is to be understood that the linear regression LR is updated with every new clutch-pressure torque pairing PT. Moreover, the linear regression LR may be preset at engine startup (i.e., the pressure-torque function may have default parameters) and be continuously updated afterwards. Furthermore, by calculating the linear regression LR, a "kiss point" of the clutch 204a can be determined. The kiss point of the clutch 204a corresponds to the position of the clutch 204a when the clutch disks 250 and the clutch plates 242 make initial frictional contact with one another but do not yet transmit torque. The kiss point of the clutch 204a can be identified as the point at which the linear regression LR meets the horizontal axis in the graph of FIG. 22 (i.e., the clutch pressure when the torque transmission is null). Identifying the kiss point of the clutch 204a can be helpful to reduce response time of the clutch 204a since, at the kiss point, the clutch 204a is ready to transmit torque.

It is to be understood that the controller 500 could map out a different linear regression LR for different speed ranges of the vehicle 20. For example, the graph of FIG. 22 may correspond to a given range of speeds of the vehicle 20, and a similar graph could be mapped for a different range of speeds of the vehicle 20. As such, the adaptive pressure-torque function of the clutch 204a may be for a particular range of speeds of the vehicle 20.

With the adaptive pressure-torque function of the clutch 204a calculated, at step 1180 the controller 500 controls the DCT 100 based on the adaptive pressure-torque function. That is, the controller 500 actuates the clutch 204a in accordance with the adaptive pressure-torque function thereof. For example, in this embodiment, during actuation of the clutch 204a causing the engagement thereof (as opposed to disengagement), for a given torque value, the controller 500 causes an increase of the pressure of transmission fluid routed to the clutch 204a to a pressure value that is at least 10% greater than a corresponding pressure indicated by the linear regression LR. For instance, in this embodiment, the pressure of transmission fluid routed to the clutch 204a is increased to a pressure value that is between 10% to 20% greater than the corresponding pressure indicated by the linear regression LR. In other words, when the controller 500 controls the clutch 204a based on the adaptive pressure-torque function, the clutch pressure exerted on the clutch 204a is greater than that needed to transmit the torque produced by the engine 52. As such, the clutch 204a is controlled with a torque "reserve" which can be beneficial as the vehicle 20 may be subjected to bumps, jumps and throttle kicks due to its use in off-road environments that can in some cases cause a drop in the torque transmitted by the clutch 204a.

It is to be understood that the same method 1100 described above is also performed for the second clutch 204b.

While the methods described above have been described as being performed generally by the same controller 500, it should be understood that this is done for brevity and simplicity of the description. It is contemplated that the controller 500 may only perform one of the methods or a selected number of the methods. In addition, one or more controllers could be in communication with one another to fulfill the functions of the controller 500.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for controlling an automatic transmission of a vehicle, comprising:
   sensing a speed of the vehicle;
   sensing an acceleration of the vehicle along three spatial axes;
   determining that the vehicle is in a jump state associated with the vehicle being off a ground surface, the jump state being defined at least in part by the acceleration of the vehicle along the three spatial axes and the speed of the vehicle; and
   controlling the transmission according to a jump strategy in response to determining that the vehicle is in the jump state.

2. The method of claim 1, wherein the jump state is defined at least in part by:
   the sum of the absolute values of the acceleration of the vehicle along the three spatial axes being less than or equal to a predetermined acceleration value; and
   the speed of the vehicle being greater than a predetermined speed.

3. The method of claim 1, wherein controlling the transmission according to the jump strategy comprises preventing shifting of an engaged gear of the transmission.

4. The method of claim 1, further comprising:
   determining that the vehicle has exited the jump state based at least on the acceleration of the vehicle along at least one of the three spatial axes; and
   controlling the transmission of the vehicle according to a post jump strategy in response to determining that the vehicle has exited the jump state,
   the post-jump strategy being different from the jump strategy.

5. The method of claim 4, wherein determining that the vehicle has exited the jump state comprises sensing an increase of the acceleration of the vehicle along the three spatial axes.

6. The method of claim 4, further comprising, prior to controlling the transmission according to the post-jump strategy and while controlling the transmission according to the jump strategy:
   identifying a vehicle pre jump speed corresponding to the speed of the vehicle immediately prior to the vehicle having been determined to be in the jump state;
   sensing a speed of a rear wheel of the vehicle after the vehicle has exited the jump state; and
   determining that the rear wheel has touched the ground surface based at least in part on the speed of the rear wheel and the vehicle pre jump speed,
   the transmission being controlled in the post-jump strategy once it has been determined that the vehicle has exited the jump state and that the rear wheel has touched the ground surface.

7. The method of claim 6, wherein the rear wheel is determined to have touched the ground surface in response to an absolute value of a difference between the speed of the rear wheel and the vehicle pre jump speed being less than or equal to a predetermined threshold speed difference.

8. The method of claim 4, further comprising, prior to controlling the transmission according to the post-jump strategy and while controlling the transmission according to the jump strategy:
   identifying a vehicle pre jump speed corresponding to the speed of the vehicle immediately prior to the vehicle having been determined to be in the jump state;
   sensing a speed of a rear wheel of the vehicle after the vehicle has exited the jump state;
   determining if the rear wheel has touched the ground surface based at least in part on the speed of the rear wheel and the vehicle pre jump speed;
   in response to determining that the vehicle has exited the jump state and that the rear wheel has touched the ground surface based at least in part on the speed of the rear wheel and the vehicle pre jump speed, controlling the transmission in the post-jump strategy;
   in response to the rear wheel having been determined not to have touched the ground surface based at least in part on the speed of the rear wheel and the vehicle pre-jump speed:
      determining a time elapsed since an initial time reference point at which the vehicle was either in the jump state or had just exited the jump state; and
      controlling the transmission in the post-jump strategy once it has been determined that the vehicle has exited the jump state and that the time elapsed since the initial time reference point is equal to or greater than a predetermined timeout.

9. The method of claim 4, further comprising, prior to controlling the transmission according to the post-jump strategy and while controlling the transmission according to the jump strategy:

determining a time elapsed since an initial time reference point at which the vehicle was either in the jump state or had just exited the jump state, the transmission being controlled in the post-jump strategy once it has been determined that the vehicle has exited the jump state and that the time elapsed since the initial time reference point is equal to or greater than a predetermined timeout.

10. The method of claim 9, wherein the predetermined timeout is less than 1 second.

11. The method of claim 4, wherein controlling the transmission according to the post-jump strategy comprises allowing shifting of an engaged gear of the transmission.

\* \* \* \* \*

UNITED STATES PATENT AND TRADEMARK OFFICE
CERTIFICATE OF CORRECTION

PATENT NO. : 11,841,079 B2
APPLICATION NO. : 18/161243
DATED : December 12, 2023
INVENTOR(S) : Robert Ebner et al.

It is certified that error appears in the above-identified patent and that said Letters Patent is hereby corrected as shown below:

In the Claims

In Column 28, Line 6, Claim 4, "post jump" should read --post-jump--

In Column 28, Lines 18 and 25, Claim 6, "pre jump" should read --pre-jump--

In Column 28, Line 33, Claim 7, "pre jump" should read --pre-jump--

In Column 28, Lines 39, 46 and 50, Claim 8, "pre jump" should read --pre-jump--

Signed and Sealed this
Thirteenth Day of August, 2024

Katherine Kelly Vidal
*Director of the United States Patent and Trademark Office*